(12) United States Patent
Aoyama et al.

(10) Patent No.: US 10,422,269 B2
(45) Date of Patent: Sep. 24, 2019

(54) COOLING DEVICE FOR INTERNAL COMBUSTION ENGINE

(71) Applicant: Toyota Jidosha Kabushiki Kaisha, Toyota-shi, Aichi-ken (JP)

(72) Inventors: Yukitoshi Aoyama, Gotenba (JP); Akira Yamashita, Shizuoka-ken (JP); Hiromichi Hashimoto, Toyota (JP); Koki Uno, Shizuoka-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/958,501

(22) Filed: Apr. 20, 2018

(65) Prior Publication Data

US 2018/0313252 A1    Nov. 1, 2018

(30) Foreign Application Priority Data

Apr. 28, 2017    (JP) ................. 2017-090166

(51) Int. Cl.
| | |
|---|---|
| *F01P 7/16* | (2006.01) |
| *F01P 3/20* | (2006.01) |
| *B60K 11/02* | (2006.01) |
| *F01P 5/10* | (2006.01) |

(Continued)

(52) U.S. Cl.
CPC ............. *F01P 7/165* (2013.01); *B60K 11/02* (2013.01); *F01P 3/20* (2013.01); *F01P 5/10* (2013.01);

(Continued)

(58) Field of Classification Search
CPC ........ F01P 3/20; F01P 5/10; F01P 5/12; F01P 7/16; F01P 7/161; F01P 7/165; F01P 2007/146; B60K 11/02

(Continued)

(56) References Cited

U.S. PATENT DOCUMENTS

| | | | | |
|---|---|---|---|---|
| 4,881,495 A | * | 11/1989 | Tornare | F02G 5/02 123/41.31 |
| 6,739,290 B2 | * | 5/2004 | Iwasaki | F01P 7/164 123/41.01 |

(Continued)

FOREIGN PATENT DOCUMENTS

| | | |
|---|---|---|
| JP | S59215915 A | 12/1984 |
| JP | 2004-324459 A | 11/2004 |

(Continued)

*Primary Examiner* — John Kwon
*Assistant Examiner* — Johnny H Hoang
(74) *Attorney, Agent, or Firm* — Dinsmore & Shohl LLP

(57) ABSTRACT

A cooling device for an internal combustion engine includes a pump portion, a circulation water passage, a thermostat configured to switch between a state where the coolant is circulated to a heat exchange water passage on which a radiator is disposed and a state where the coolant is not circulated to the heat exchange water passage, and a control unit configured to control the pump portion. The control unit is configured to control a three-way valve such that a first pump and a second pump are connected in parallel when the thermostat switches to the state where the coolant is circulated to the heat exchange water passage and controls the three-way valve such that the first pump and the second pump are connected in series when the thermostat switches to the state where the coolant is not circulated to the heat exchange water passage.

9 Claims, 15 Drawing Sheets

(51) Int. Cl.
*F02F 1/10* (2006.01)
*F01P 7/14* (2006.01)

(52) U.S. Cl.
CPC ......... *F01P 7/161* (2013.01); *F01P 2007/146* (2013.01); *F01P 2007/168* (2013.01); *F02F 1/10* (2013.01)

(58) Field of Classification Search
USPC ......... 123/41.01, 41.02, 41.04, 41.34, 41.08, 123/41.09
See application file for complete search history.

(56) References Cited

U.S. PATENT DOCUMENTS

| | | | | |
|---|---|---|---|---|
| 6,962,131 | B2* | 11/2005 | Aketa | F01P 3/02 123/41.01 |
| 2002/0189556 | A1* | 12/2002 | Morii | F01P 5/10 123/41.1 |
| 2014/0130753 | A1* | 5/2014 | Koyama | F01P 7/167 123/41.05 |
| 2014/0250886 | A1* | 9/2014 | Mizoguchi | F01K 23/10 60/663 |
| 2016/0265458 | A1* | 9/2016 | Okada | F02D 41/0065 |
| 2018/0298853 | A1* | 10/2018 | Yoshioka | F01P 3/20 |

FOREIGN PATENT DOCUMENTS

| | | |
|---|---|---|
| JP | 2013-087761 A | 5/2013 |
| JP | 2014-005815 A | 1/2014 |
| JP | 2016-079819 A | 5/2016 |
| JP | 2016-084756 A | 5/2016 |

\* cited by examiner

COOLING DEVICE FOR INTERNAL COMBUSTION ENGINE

CROSS-REFERENCE TO RELATED APPLICATIONS

This application claims priority to Japanese Patent Application No. 2017-090166 filed on Apr. 28, 2017, which is incorporated herein by reference in its entirety including the specification, drawings and abstract.

BACKGROUND

1. Technical Field

The present disclosure relates to a cooling device for an internal combustion engine.

2. Description of Related Art

A cooling device for an internal combustion engine that cools an internal combustion engine by circulating a coolant discharged by a pump to the internal combustion engine and a heat exchanger is known. Especially, an increase in the output of the pump has been studied as the flow rate of the coolant needed for the cooling increases along with an increase in the size of the internal combustion engine. However, an increase in the size of the pump is needed for the increase in the output of the pump, and thus ensuring a large set space for a pump with a large volume to be mounted around an engine body is not easy. Connecting two pumps in parallel to each other so that the flow rate is increased without an increase in the volume per pump is known in this regard (Japanese Unexamined Patent Application Publication No. 2016-79819 (JP 2016-79819 A)).

SUMMARY

Known is the cooling device for an internal combustion engine being provided with the heat exchanger that is disposed in parallel to circulation water passage through which the coolant passes via the pump and the internal combustion engine. In the cooling device as described above, the coolant is relatively easy to flow when the coolant is circulated to the circulation water passage and the heat exchanger and the coolant is relatively difficult to flow when the coolant is circulated merely to the circulation water passage. When the coolant is relatively easy to flow, for example, a sufficient flow rate can be ensured even when the coolant discharged from the pump has a low coolant pressure. Accordingly, in this case, the volume of the pump can be increased and the flow rate can be increased by the pumps being connected in parallel.

A sufficient flow rate cannot be ensured when the coolant discharged from the pump has a low coolant pressure and the coolant is relatively difficult to flow. In a case where the pumps are connected in parallel as described above, the coolant pressure that can be output by the entire pumps described above is equal to the coolant pressure that can be output by one of the pumps. As a result, the coolant pressure of the coolant discharged from the entire pumps cannot be increased. Accordingly, in a case where the coolant is difficult to flow to the cooling device, a sufficient flow rate cannot be ensured even when the pumps are connected in parallel.

Therefore, it is not easy to supply the coolant by a sufficient amount from the pump without an increase in the volume per pump.

The present disclosure provides a cooling device that is capable of supplying a coolant by a sufficient amount from a pump without an increase in the volume per pump.

An aspect of the present disclosure relates to a cooling device for an internal combustion engine. The cooling device includes a pump portion configured to pump a coolant of the internal combustion engine and a circulation water passage including an engine water passage of the internal combustion engine configured to connect the pump portion and the engine water passage to each other such that the coolant returns back to the pump portion through the engine water passage after the coolant is pumped from the pump portion. The cooling device includes a heat exchanger configured to perform heat exchange with the coolant and a heat exchange water passage on which the heat exchanger is disposed, the heat exchange water passage being disposed in parallel to at least a pad of the circulation water passage. The cooling device includes a water passage switching device configured to switch between a state where the coolant is circulated to the heat exchange water passage and a state where the coolant is not circulated to the heat exchange water passage and a control device configured to control the pump portion.

The pump portion includes a first pump, a second pump, and a pump switching device configured to switch between a state where the first pump and the second pump are connected in parallel and a state where the first pump and the second pump are connected in series. The control device is configured to control the pump switching device such that the first pump and the second pump are connected in parallel when the water passage switching device switches to the state where the coolant is circulated to the heat exchange water passage and the coolant is circulated to the circulation water passage and the heat exchange water passage. The control device is configured to control the pump switching device such that the first pump and the second pump are connected in series when the water passage switching device switches to the state where the coolant is not circulated to the heat exchange water passage and the coolant is circulated merely to the circulation water passage.

In the cooling device according to the aspect of the present disclosure, the water passage switching device may be a thermostat disposed on the heat exchange water passage and configured to switch between a valve open state and a valve closed state in accordance with a coolant temperature of the coolant. The thermostat may be configured such that the coolant is circulated to the heat exchange water passage when the thermostat is in the valve open state and may be configured such that the circulation of the coolant to the heat exchange water passage is stopped when the thermostat is in the valve closed state.

In the cooling device according to the aspect of the present disclosure, a maximum flow rate that is output by the pump portion by the pump switching device connecting the first pump and the second pump in parallel to each other may exceed a maximum flow rate that is output by the pump portion by the pump switching device connecting the first pump and the second pump in series to each other when the water passage switching device switches to the state where the coolant is circulated to the heat exchange water passage. The maximum flow rate that is output by the pump portion by the pump switching device connecting the first pump and the second pump in parallel to each other may be smaller than the maximum flow rate that is output by the pump portion by the pump switching device connecting the first pump and the second pump in series to each other when the water passage switching device switches to the state where the coolant is not circulated to the heat exchange water passage.

In the cooling device according to the aspect of the present disclosure, the circulation water passage and the heat exchange water passage may be configured such that a flow path resistance of a path of the coolant is equal to or less than a reference flow path resistance when the water passage switching device switches to the state where the coolant is circulated to the heat exchange water passage and the flow path resistance of the path of the coolant exceeds the reference flow path resistance when the water passage switching device switches to the state where the coolant is not circulated to the heat exchange water passage. When a curve representing a relationship between a flow rate and a water pressure at a time when the flow path resistance of the path of the coolant is any value is a resistance curve, the reference flow path resistance may be a flow path resistance at a time when the resistance curve passes through an intersection point between a parallel characteristic curve and a series characteristic curve. The parallel characteristic curve may be a curve representing a relationship between the maximum flow rate and a maximum water pressure that is output by the pump portion in the state where the first pump and the second pump are connected in parallel. The series characteristic curve may be a curve representing the relationship between the maximum flow rate and the maximum water pressure that is output by the pump portion in the state where the first pump and the second pump are connected in series.

In the cooling device according to the aspect of the present disclosure, the control device may be configured to control the pump switching device such that the first pump and the second pump are connected in parallel irrespective of a state of the water passage switching device and drive merely one of the first pump and the second pump when a requested flow rate to the pump portion is smaller than a flow rate determined in advance.

In the cooling device according to the aspect of the present disclosure, the heat exchanger may include a first heat exchanger and a second heat exchanger. The heat exchange water passage may include a first heat exchange water passage on which the first heat exchanger is disposed, the first heat exchange water passage being disposed in parallel to at least part of the circulation water passage, and a second heat exchange water passage on which the second heat exchanger is disposed, the second heat exchange water passage being disposed in parallel to at least a part of the circulation water passage. The water passage switching device may include a first water passage switching device switching between a state where the coolant is circulated to the first heat exchange water passage and a state where the coolant is not circulated to the first heat exchange water passage and a second water passage switching device switching between a state where the coolant is circulated to the second heat exchange water passage and a state where the coolant is not circulated to the second heat exchange water passage. The water passage switching device may switch to the state where the coolant is circulated to the heat exchange water passage when the first water passage switching device switches to the state where the coolant is circulated to the first heat exchange water passage and the second water passage switching device switches to the state where the coolant is circulated to the second heat exchange water passage. The water passage switching device may switch to the state where the coolant is not circulated to the heat exchange water passage when the first water passage switching device switches to the state where the coolant is not circulated to the first heat exchange water passage and the second water passage switching device switches to the state where the coolant is not circulated to the second heat exchange water passage.

In the cooling device according to the aspect of the present disclosure, the control device may be configured to store, as a first region, a region of a flow rate and a water pressure that is output simply by the first pump and the second pump being connected in parallel when the first water passage switching device and the second water passage switching device switch to a state where the coolant is circulated to either the first heat exchange water passage or the second heat exchange water passage. The control device may be configured to store, as a second region, a region of the flow rate and the water pressure that is output simply by the first pump and the second pump being connected in series when the first water passage switching device and the second water passage switching device switch to the state where the coolant is circulated to either the first heat exchange water passage or the second heat exchange water passage. The control device may be configured to calculate a requested flow rate to the pump portion and a requested water pressure to the pump portion determined by the requested flow rate, a state of the first water passage switching device, and a state of the second water passage switching device. The control device may be configured to control the pump switching device such that the first pump and the second pump are connected in parallel in a case where the requested flow rate and the requested water pressure are included in the first region. The control device may be configured to control the pump switching device such that the first pump and the second pump are connected in series in a case where the requested flow rate and the requested water pressure are included in the second region.

In the cooling device according to the aspect of the present disclosure, the pump portion may include the first pump pumping the coolant, the second pump pumping the coolant, an inlet water passage into which the coolant flows, an outlet water passage from which the coolant flows out, a first water passage on which the first pump is disposed, a second water passage on which the second pump is disposed, an inter-pump water passage, and a check valve. The first water passage and the second water passage may communicate with the inlet water passage at a branch point, be disposed in parallel to each other, and communicate with the outlet water passage at a confluence point. The inter-pump water passage may allow a water passage of the first water passage on a coolant discharge side of the first pump and a water passage of the second water passage on a coolant suction side of the second pump to communicate with each other. The check valve may be disposed on the second water passage between a connection portion between the second water passage and the inter-pump water passage and the branch point. The pump switching device may be a three-way valve disposed in a connection portion between the first water passage and the inter-pump water passage. The three-way valve may be configured to selectively switch between a first switching position at which the coolant is circulated to the first water passage as it is without flowing into the inter-pump water passage after the coolant flows through the first water passage and a second switching position at which the coolant is allowed to flow into the inter-pump water passage without circulating to the first water passage as it is after the coolant flows through the first water passage. The control device may be configured to switch the three-way valve to the first switching position when the first pump and the second pump are connected in parallel and switch the three-way valve to the second switching position when the first pump and the second pump are connected in series.

In the cooling device according to the aspect of the present disclosure, the pump portion may include the first pump pumping the coolant, the second pump pumping the coolant, an inlet water passage into which the coolant flows, an outlet water passage from which the coolant flows out, a first water passage on which the first pump is disposed, a second water passage on which the second pump is disposed, an inter-pump water passage, a first check valve, a second check valve, and the pump switching device. The first water passage and the second water passage may communicate with the inlet water passage at a branch point, be disposed in parallel to each other, and communicate with the outlet water passage at a confluence point between the first water passage and the second water passage. The inter-pump water passage may allow a water passage of the first water passage on a coolant discharge side of the first pump and a water passage of the second water passage on a coolant suction side of the second pump to communicate with each other. The first check valve may be disposed on the second water passage between a connection portion between the second water passage and the inter-pump water passage and the branch point. The second check valve may be disposed on the first water passage between a connection portion between the first water passage and the inter-pump water passage and the confluence point.

The pump switching device may be disposed on the inter-pump water passage. The first pump may be disposed on the first water passage between the connection portion between the first water passage and the inter-pump water passage and the branch point. The second pump may be disposed on the second water passage between the connection portion between the second water passage and the inter-pump water passage and the confluence point. The pump switching device may be an on-off valve disposed on the inter-pump water passage. The on-off valve may be configured to selectively switch between a first switching position at which the inter-pump water passage is closed and a second switching position at which the inter-pump water passage is open. The control device may be configured to put the on-off valve into the first switching position when the first pump and the second pump are connected in parallel and put the on-off valve into the second switching position when the first pump and the second pump are connected in series.

According to the aspect of the present disclosure, a coolant can be supplied by a sufficient amount from a pump without an increase in the volume per pump.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
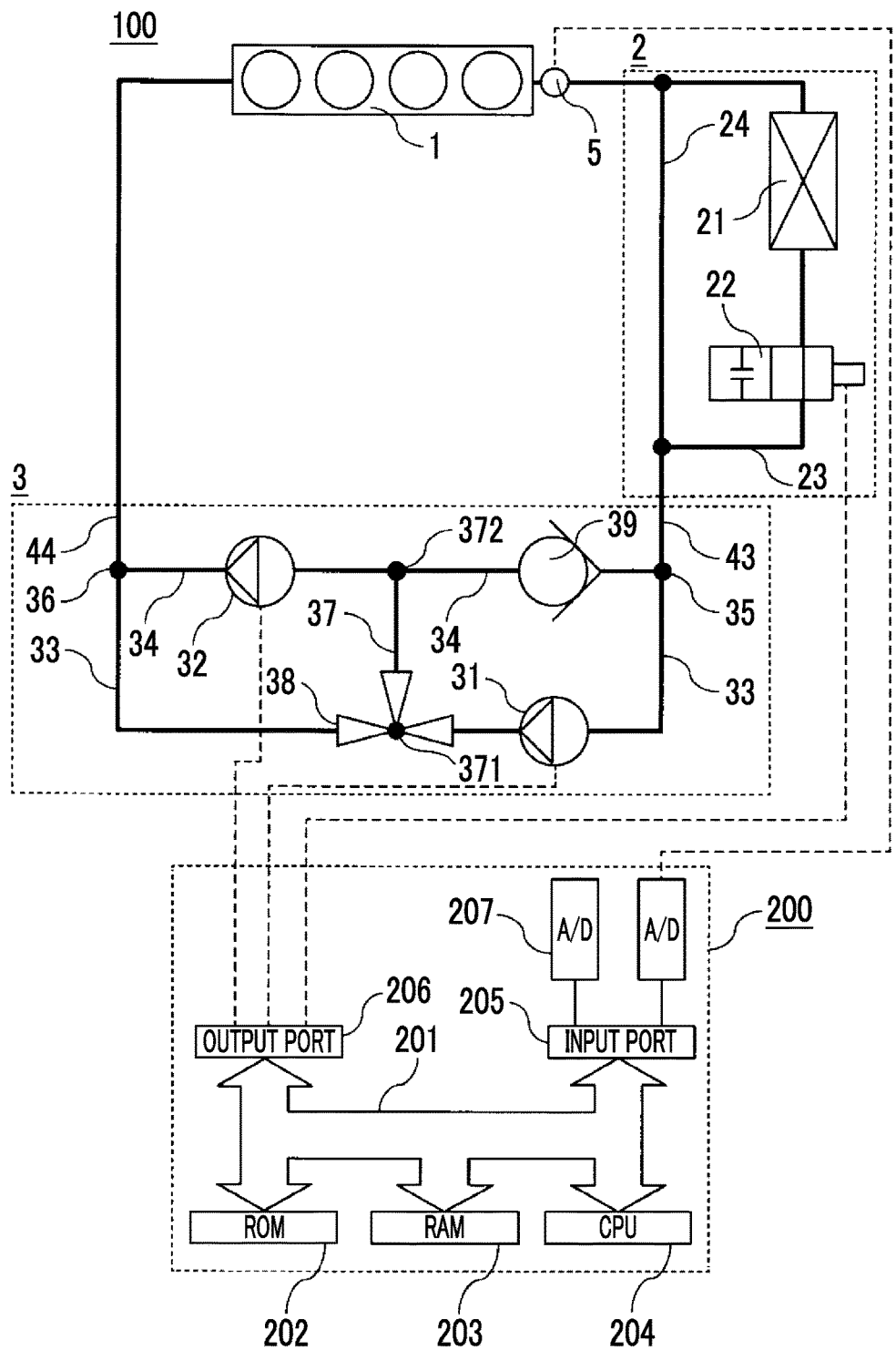
FIG. 1 is a schematic diagram illustrating a cooling device for an internal combustion engine according to a first example of the present disclosure.

Hereinafter, examples of the present disclosure will be described in detail with reference to accompanying drawings. In the following description, the same reference numerals will be used to refer to the same component parts.

FIG. 1 is a schematic diagram of a cooling device for an internal combustion engine according to a first example of the present disclosure. A cooling device 100 for an internal combustion engine according to the first example is provided with an engine body 1, a heat exchange portion 2, and a pump portion 3. Each of the engine body 1, the heat exchange portion 2, and the pump portion 3 is connected in a loop shape by a coolant passage and disposed such that a coolant circulates in the order of the engine body 1, the heat exchange portion 2, and the pump portion 3.

The engine body 1 combusts a fuel in a combustion chamber disposed in the engine body 1 to generate a drive force. The engine body 1 needs to be cooled because the engine body 1 reaches a high temperature as a result of the combustion of the fuel. In this example, the coolant is used for the cooling of the engine body 1. An engine water passage through which the coolant circulates is disposed in the engine body 1. Heat is released to the outside of the engine body 1 via the coolant circulating through the engine water passage. As a result, the engine body 1 is cooled. The engine water passage includes, for example, a water jacket formed around the combustion chamber of a cylinder block and the coolant passage formed in a cylinder head.

The heat exchange portion 2 is a device for performing heat exchange between the coolant and the outside of the engine. In this example, the heat exchange portion 2 is disposed downstream of the engine body 1 and the coolant heated by the engine body 1 is cooled by the heat exchange portion 2.

In this example, the heat exchange portion 2 is provided with a radiator 21, a thermostat 22, a heat exchange water passage 23, and a bypass water passage 24 as illustrated in FIG. 1. The radiator 21 and the thermostat 22 are disposed on the heat exchange water passage 23, and the bypass water passage 24 is disposed to bypass the radiator 21 and the thermostat 22.

The radiator 21 releases the heat of the coolant to the outside by circulating the coolant into the radiator 21. The heat of the coolant is released to the outside via a wall surface of a water passage disposed in the radiator 21. Accordingly, the coolant can be cooled more efficiently as the area of contact between the coolant and the wall surface of the water passage increases, that is, as the surface area of the wall surface of the water passage increases. For a large surface area of the water passage of the radiator 21, this example is designed such that the diameter of each water passage disposed in the radiator 21 is smaller than the diameter of the water passage of the bypass water passage 24.

The thermostat 22 is disposed on the heat exchange water passage 23 on the downstream side of the radiator 21. The thermostat 22 is capable of selectively switching between an open state where the flow of the coolant through the heat exchange water passage 23 is allowed and a closed state where the flow of the coolant is blocked. In this example, the radiator 21 and the thermostat 22 are disposed in series on the heat exchange water passage 23, and thus the state of the circulation of the coolant to the radiator 21 switches by the state of the thermostat 22 switching.

In this example, a member that is in contact with a valve body of the thermostat 22, expands when the coolant temperature of the coolant increases, and contracts when the coolant temperature of the coolant decreases is disposed in the thermostat 22. The thermostat 22 is put into the open state when the member expands, and the thermostat 22 is put into the closed state when the member contracts. Accordingly, the thermostat 22 is automatically put into the open state when the coolant temperature of the coolant is equal to or higher than a predetermined temperature, and the thermostat 22 is automatically put into the closed state when the coolant temperature of the coolant is lower than the predetermined temperature.

As a result, in this embodiment, the thermostat 22 is put into the closed state in a case where the temperature of the coolant is low. As a result, the coolant flows merely through the bypass water passage 24 without flowing through the heat exchange water passage 23. Accordingly, the circulation of the coolant to the radiator 21 is blocked and the cooling of the coolant is suppressed. In a case where the coolant temperature of the coolant is high, in contrast, the thermostat 22 is put into the open state. As a result, the coolant flows through both the heat exchange water passage 23 and the bypass water passage 24. Accordingly, the coolant circulates to the radiator 21. As a result, the coolant is cooled.

The open state of the thermostat 22 or the closed state of the thermostat 22 may also be controlled by an actuator.

In this example, the water passage through which the coolant returns back to the pump portion 3 through the engine water passage of the engine body 1 and the bypass water passage 24 after being discharged from the pump portion 3 will be referred to as a "circulation water passage". Accordingly, in the example illustrated in FIG. 1, the circulation water passage is composed of the coolant passage from the pump portion 3 to the engine body 1, the engine water passage, the coolant passage from the engine body 1 to the bypass water passage 24, the bypass water passage 24, and the coolant passage from the bypass water passage 24 to the pump portion 3. The heat exchange water passage 23 on which the radiator 21 is disposed is disposed in parallel to a part of the circulation water passage. The coolant flows through the circulation water passage at all times, and whether or not the coolant flows through the heat exchange water passage 23 is controlled by the thermostat 22. In this example, the engine water passage of the engine body 1 and the bypass water passage 24 are a part of the circulation water passage.

The pump portion 3 circulates the coolant to the engine body 1 and the heat exchange portion 2 by increasing the coolant pressure of the coolant. In this example, the pump portion 3 is provided with a first pump 31, a second pump 32, a three-way valve 38, and a check valve 39 as illustrated in FIG. 1. The pump portion 3 is provided with a first water passage 33 and a second water passage 34 that are disposed in parallel. Both the first water passage 33 and the second water passage 34 communicate with an inlet water passage 43 at a branch point 35 at respective upstream ends thereof, and both the first water passage 33 and the second water passage 34 communicate with an outlet water passage 44 at a confluence point 36 at respective downstream ends thereof. In other words, in the pump portion 3, the inlet water passage 43 branches into the first water passage 33 and the second water passage 34 at the branch point 35, and the first water passage 33 and the second water passage 34 lead to the outlet water passage 44 after being merged at the confluence point 36. In addition, the first water passage 33 and the second water passage 34 are interconnected by an inter-pump water passage 37 at respective intermediate parts thereof. In the following description, the connection portion between the first water passage 33 and the inter-pump water passage 37 will be referred to as a "first connection portion 371" and the connection portion between the second water passage 34 and the inter-pump water passage 37 will be referred to as a "second connection portion 372".

The first pump 31 is disposed on the first water passage 33 between the branch point 35 and the first connection portion 371, and the second pump 32 is disposed on the second water passage 34 between the second connection portion 372 and the confluence point 36.

The first pump 31 and the second pump 32 are pumps for pumping the coolant. An inflow port for supplying the coolant and a discharge port for discharging the coolant are disposed in each of the first pump 31 and the second pump 32. The coolant supplied from the inflow port is pressurized by the first pump 31 or the second pump 32 and discharged from the discharge port.

In this example, the first pump 31 and the second pump 32 are electric pumps and the first pump 31 and the second pump 32 are capable of controlling the coolant pressure of the coolant that is discharged. In this example, the maximum coolant pressure of the coolant that can be discharged by the first pump 31 is lower than the maximum coolant pressure of the coolant that can be discharged by the second pump 32. The first pump 31 and the second pump 32 may also have the same performance. In other words, the maximum coolant pressure of the coolant that can be discharged by the first pump 31 and the maximum coolant pressure of the coolant that can be discharged by the second pump 32 may be equal to each other.

The three-way valve 38 is disposed in the first connection portion 371. The three-way valve 38 is switchable between a first switching position at which the coolant is circulated to the first water passage 33 as it is after flowing through the first water passage and a second switching position at which the coolant is allowed to flow into the inter-pump water passage 37 after flowing through the first water passage 33. The three-way valve 38 is controlled by receiving a signal from a control unit 200 (described later).

The check valve 39 is a valve for circulating the coolant in one direction. In this example, the check valve 39 is disposed on the second water passage 34 between the branch point 35 and the second connection portion 372. The check valve 39 is configured to allow the circulation of the coolant flowing from the branch point 35 toward the second connection portion 372 and prohibit the circulation of the coolant from the second connection portion 372 toward the branch point 35.

In this example, the method by which the first pump 31 and the second pump 32 are connected to each other can switch between parallel and serial by the three-way valve 38 being controlled between the first switching position and the second switching position.

Specifically, in a case where the three-way valve 38 switches to the first switching position, the circulation of the coolant to the inter-pump water passage 37 is blocked, and thus the first pump 31 and the second pump 32 are connected in parallel. In other words, the coolant flowing into the pump portion 3 is divided into the first water passage 33 and the second water passage 34 at the branch point 35, and then the coolants are discharged after the coolant pressures are raised by the first pump 31 and the second pump 32, respectively. The coolants discharged by the first pump 31 and the second pump 32 flow toward the confluence point 36 and are discharged to the outside of the pump portion 3.

In a case where the three-way valve 38 switches to the second switching position, in contrast, the coolant is circulated to the inter-pump water passage 37 and the first pump 31 and the second pump 32 are connected in series. In other words, the coolant flowing into the pump portion 3 flows into the first pump 31 through the branch point 35 and is discharged after the coolant pressure is raised. The coolant discharged from the first pump 31 flows into the second water passage 34 through the three-way valve 38 and the inter-pump water passage 37. In this case, the coolant discharged from the first pump 31 flows into the second pump 32 without returning to the branch point 35 through the second water passage 34 since the check valve 39 is disposed between the branch point 35 and the second connection portion 372. The coolant flowing into the second pump 32 is discharged after the coolant pressure is raised. The coolant discharged from the second pump 32 flows toward the confluence point 36 and is discharged from the pump portion 3. In this case, the coolant does not circulate between the first connection portion 371 and the confluence point 36 since the circulation of the coolant is limited by the three-way valve 38.

A digital computer constitutes the control unit 200. The control unit 200 is provided with a ROM 202, a RAM 203, a CPU 204, an input port 205, and an output port 206 interconnected by a bidirectional bus 201.

Output signals of various sensors needed for controlling the cooling device 100 for and internal combustion engine are input to the input port 205. In this example, an analog signal received from a coolant temperature sensor 5 for measuring the coolant temperature of the coolant is input to the input port 205 after being converted into a digital signal via an AD converter 207. In this example, the coolant temperature sensor 5 is disposed on the water passage between the engine body 1 and the heat exchange portion 2.

In this example, the output port 206 outputs a digital signal calculated by the CPU 204 toward the first pump 31, the second pump 32, and the three-way valve 38.

Figure 2:
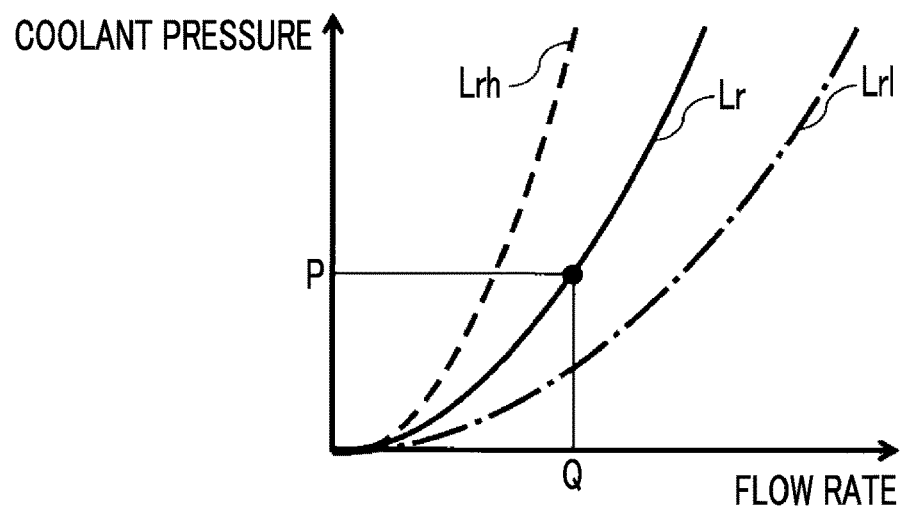
FIG. 2 is a graph of a resistance curve showing a relationship between the coolant pressure and the flow rate of a coolant discharged by a pump.

General properties relating to pump-based liquid discharge will be described below before the example of the present disclosure is described. FIG. 2 is a graph showing a relationship between a flow rate Q (horizontal axis) per unit time of a liquid discharged from a pump disposed on a certain water passage and a water pressure P (vertical axis) of the pump needed for outputting the flow rate Q.

As indicated by a solid line Lr in FIG. 2, the flow rate of the liquid discharged by the pump becomes Q when the water pressure of the liquid discharged by the pump is P. The relationship between the water pressure P and the flow rate Q changes in accordance with the difficulty of liquid flow through the water passage on which the pump is disposed. In the following description, a curve representing the relationship between the water pressure P and the flow rate Q will be referred to as a "resistance curve".

In general, the resistance curve is expressed in the form of a quadratic function of the flow rate Q, that is, $P=R \times Q^2$. The coefficient R is a value representing the difficulty of liquid flow through the water passage on which the pump is disposed and will be referred to as a "flow path resistance". The flow path resistance R is determined in accordance with the shape of the water passage for the pump to allow the liquid to flow. For example, the liquid becomes harder to flow as the length of the water passage increases, and thus the flow path resistance R increases. The resistance curve at a time when the flow path resistance R is large is indicated by a dashed line Lrh in FIG. 2. When the water passage has a large diameter, in contrast, the liquid becomes easy to flow, and thus the flow path resistance R decreases. The resistance curve at a time when the flow path resistance R is small is indicated by a chain line Lrl in FIG. 2.

Figure 3:
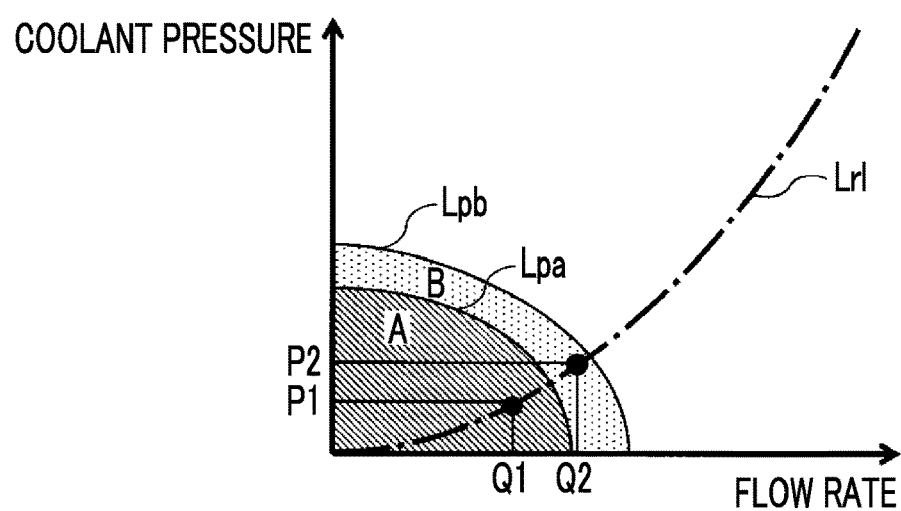
FIG. 3 is a graph showing a relationship between a characteristic curve of a single pump and the resistance curve.

In a case where the pump is driven by a motor, the flow rate Q and the water pressure P that can be discharged by the pump are determined in accordance with the maximum output of the motor. FIG. 3 is a graph showing the ranges of the flow rate Q and the water pressure P that can be discharged by the pump.

The ranges of the flow rate Q and the water pressure P that can be discharged by a single pump WPA is represented by a region A surrounded by a solid line Lpa in FIG. 3. The solid line Lpa surrounding the region A in FIG. 3 represents the relationship between the flow rate Q and the water pressure P in a case where the pump WPA is driven at the maximum output. The solid line Lpa will be referred to as a "pump characteristic curve".

In a case where the configuration of the water passage is determined and the flow path resistance R of the water passage is determined, the flow rate Q that can be discharged by the pump can be calculated by the pump characteristic curve being used. In a case where the flow path resistance R is R1 and thus the resistance curve is the curve that is represented by the chain line Lrl in FIG. 3, for example, the water pressure of P1 is needed for the liquid to be discharged by a flow rate Q1 from the pump WPA and the water pressure of P2 is needed for the liquid to be discharged by a flow rate Q2 exceeding the flow rate Q1. In the case as described above, a determination that the flow rate Q1 and the water pressure P1 can be discharged by the pump WPA can be made because the flow rate Q1 and the water pressure P1 are included in the region A, and a determination that the flow rate Q2 and the water pressure P2 cannot be discharged by the pump WPA can be made because the flow rate Q2 and the water pressure P2 are not included in the region A.

Conceivable is a case where the liquid is discharged by the flow rate Q2 by a pump WPB capable of producing an output exceeding the output of the pump WPA being used. Since the output of the pump WPB exceeds the output of the pump WPA, the pump characteristic curve of the pump WPB is positioned outside the pump characteristic curve of the pump WPA and represented by a solid line Lpb as illustrated in FIG. 3. Accordingly, the pump WPB is capable of discharging the flow rate Q and the water pressure P of the region that is included in the region A or a region B inside the pump characteristic curve.

Also conceivable is a case where the liquid is discharged by the flow rate Q2 by the pump WPB being used with respect to a water passage that has the flow path resistance R as in the example described above. In this case, the flow rate Q2 and the water pressure P2 are included in the region B, and thus the liquid can be discharged by the pump WPB by the amount of the flow rate Q2. When the pump WPA is replaced with the pump WPB, the output of the pump can be increased as described above. As a result, the flow rate Q of the liquid that can be discharged from the pump can be increased.

A pump with an even larger output may be used in a case where the flow rate Q even larger than in the region B is discharged. For the output of the pump to be increased, however, the volume of the pump should be increased. In the case as described above, a problem arises as a wide space for pump mounting should be ensured in a vehicle.

Ensuring narrow spaces in a plurality of places is easier than ensuring a wide space in one place. Considered in this regard is to discharge the liquid with a flow rate Q3 positioned outside the range of the region B by using a plurality of pumps without increasing the volume per pump.

The flow rate of the liquid discharged from the pumps can be increased by the pumps being connected in parallel. In the following description, a case where the pumps are connected in parallel as described above will be described first.

Figure 4A:
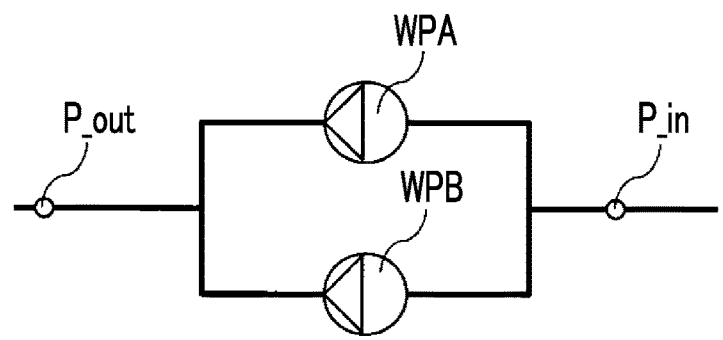
FIG. 4A is a schematic diagram illustrating pumps being connected in parallel.

FIG. 4A shows a positional relationship in a case where the pump WPA and the pump WPB are disposed in parallel. As illustrated in FIG. 4A, the liquid supplied to a point P_in branches into the pump WPA and the pump WPB. Subsequently, the liquid that has a pressure increased by the pump WPA and the liquid that has a pressure increased by the pump WPB are merged and discharged from a point P_out.

As described above, the liquid is discharged from the point P_out after the pressure of the liquid supplied to the point P_in is increased. Accordingly, the pumps and the water passage between the point P_in and the point P_out can be regarded as a single pump. The pump that is formed by the pump WPA and the pump WPB being disposed in parallel will be referred to as a pump WPC.

The pump WPC as described above has the following characteristics. Firstly, since the pressure of the liquid is increased by either the pump WPA or the pump WPB in FIG. 4A, a water pressure PC that can be output by the pump WPC is equal to the water pressure that can be output by the pump WPA or the pump WPB alone. In the meantime, since the liquid pressurized by the pump WPA and the liquid pressurized by the pump WPB are merged, a flow rate QC that can be discharged by the pump WPC is the total value of a flow rate QA that can be discharged by the pump WPA and a flow rate QB that can be discharged by the pump WPB. In other words, the relationship of QC=QA+QB is established.

Figure 4B:
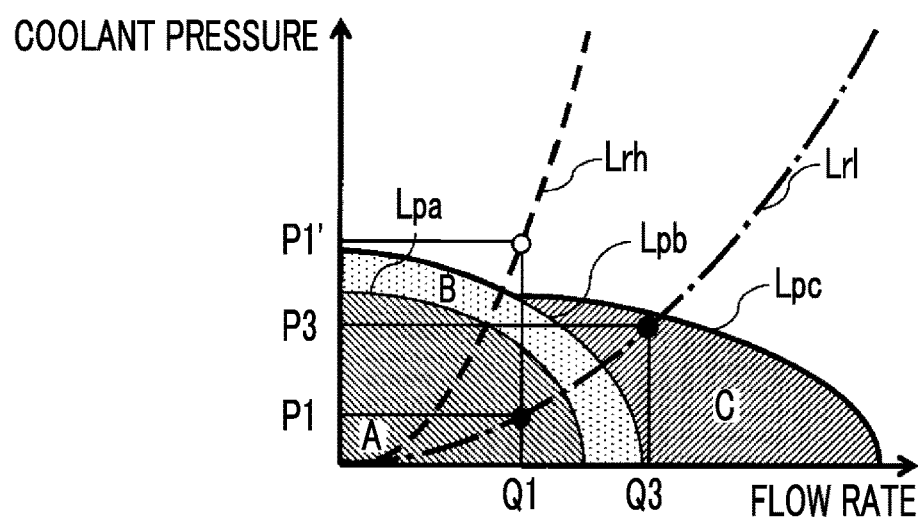
FIG. 4B is a graph showing the relationship between the characteristic curve and the resistance curve in a case where the pumps are connected in parallel.

A solid line Lpc in FIG. 4B is a graph showing the pump characteristic curve of the pump WPC. Since the relationship of QC=QA+QB is established as described above, the pump characteristic curve of the pump WPC becomes the curve in which the pump characteristic curve of the pump WPA (solid line Lpa) and the pump characteristic curve of the pump WPB (solid line Lpb) are summed up in the direction of the flow rate Q. The range that can be output by the pump WPC is the range that is surrounded by the pump characteristic curve of the pump WPC, and thus is the region A, the region B, and a region C. In other words, the outputable region is widened by the part of the region C by the pump WPA and the pump WPB being disposed in parallel.

Conceivable is a case where, for example, the flow path resistance R is relatively small and the resistance curve is represented by the chain line Lrl in FIG. 4B. In the case as described above, the liquid can be discharged by the flow rate Q3 once the pump WPA and the pump WPB are connected in parallel and the liquid is pressurized by a water pressure P3.

When the path of a flow path changes, the shape of the flow path such as the length of the flow path and the diameter of the flow path changes, and then the flow path resistance R changes. In a case where an increase in the length of the flow path and an increase in the flow path resistance R cause the resistance curve in FIG. 4B to change from the chain line Lrl to the dashed line Lrh, for example, the liquid should be pressurized by a water pressure P1' for the liquid to be discharged by the flow rate Q1. However, the water pressure P1' is included in none of the regions A, B, C, and thus the liquid cannot be discharged by the flow rate Q1 by the pump WPC. In other words, the flow rate cannot be increased when the flow path resistance is large, although the flow rate can be increased when the flow path resistance is small, after the pumps are connected in parallel.

The water pressure of the liquid discharged from the pumps can be increased by the pumps being connected in series. In the following description, a case where the pumps are connected in series as described above will be described.

Figure 5A:
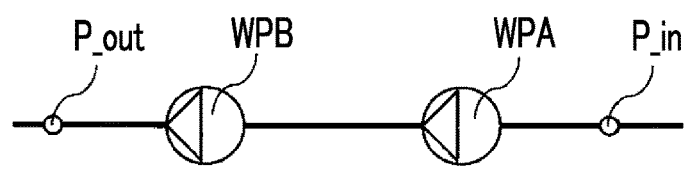
FIG. 5A is a schematic diagram illustrating the pumps being connected in series.

FIG. 5A shows a positional relationship in a case where the pump WPA and the pump WPB are disposed in series. As illustrated in FIG. 5A, the liquid supplied to the point P_in is pressurized by the pump WPA, further pressurized by the pump WPB, and then discharged from the point P_out.

As in the example illustrated in FIG. 4A, the pumps and the watch passage between the point P_in and the point P_out can be regarded as a single pump. The pump that is formed by the pump WPA and the pump WPB being disposed in series will be referred to as a pump WPD.

The pump WPD as described above has the following characteristics. Firstly, since the pressure of the liquid is increased by both the pump WPA and the pump WPB in FIG. 5A, a water pressure PD that can be output by the pump WPD is the total value of a water pressure PA that can be output by the pump WPA and a water pressure PB that can be output by the pump WPB. In other words, the relationship of PD=PA+PB is established. In the meantime, since the liquid discharged by the pump WPA flows into the pump WPB without exception, a flow rate QD that can be discharged by the pump WPD is equal to the flow rate QA that can be discharged by the pump WPA or the flow rate QB that can be discharged by the pump WPB.

Figure 5B:
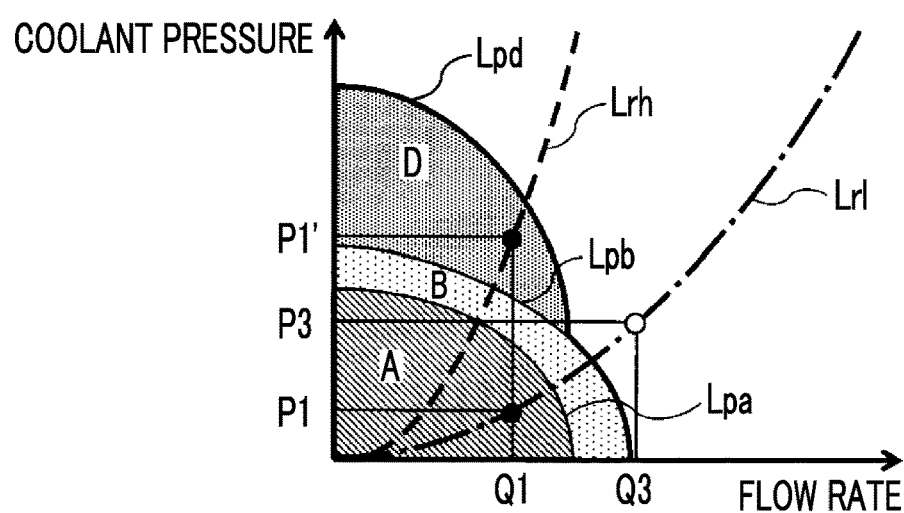
FIG. 5B is a graph showing the relationship between the characteristic curve and the resistance curve in a case where the pumps are connected in series.

A solid line Lpd in FIG. 5B is a graph showing the pump characteristic curve of the pump WPD. Since the relationship of PD=PA+PB is established as described above, the pump characteristic curve of the pump WPD becomes the curve in which the pump characteristic curve of the pump WPA (solid line Lpa) and the pump characteristic curve of the pump WPB (solid line Lpb) are summed up in the direction of the water pressure P. The range that can be output by the pump WPD is the range that is surrounded by the pump characteristic curve of the pump WPD, and thus is the region A, the region B, and a region D. In other words, the outputable region is widened by the part of the region D by the pump WPA and the pump WPB being disposed in series. For example, the liquid can be discharged by the flow rate Q1 once the pump WPA and the pump WPB are connected in series and the liquid is pressurized by the water pressure P1' on the resistance curve of the dashed line Lrh.

In a case where the flow path resistance R is small and the resistance curve is changed from the dashed line Lrh to the chain line Lrl, the liquid cannot be discharged by the flow rate Q3 even after the pumps are connected in series.

As described above, the flow rate Q can be increased by the pumps being connected in parallel in a case where the flow path resistance R is small and the flow rate Q can be increased by the pumps being connected in series in a case where the flow path resistance R is large. However, the flow rate Q that can be discharged from the pump portion 3 cannot be sufficiently increased even after the pumps are connected in series in a case where the flow path resistance R is small or the flow rate Q that can be discharged from the pump portion 3 cannot be sufficiently increased even after the pumps are connected in parallel in a case where the flow path resistance R is large.

In the first example of the present disclosure, the method by which the pumps are connected to each other switches between parallel and serial in accordance with the flow path resistance R of the path of the coolant. The switching of the pumps will be described below with reference to FIGS. 6 to 8.

Figure 6:
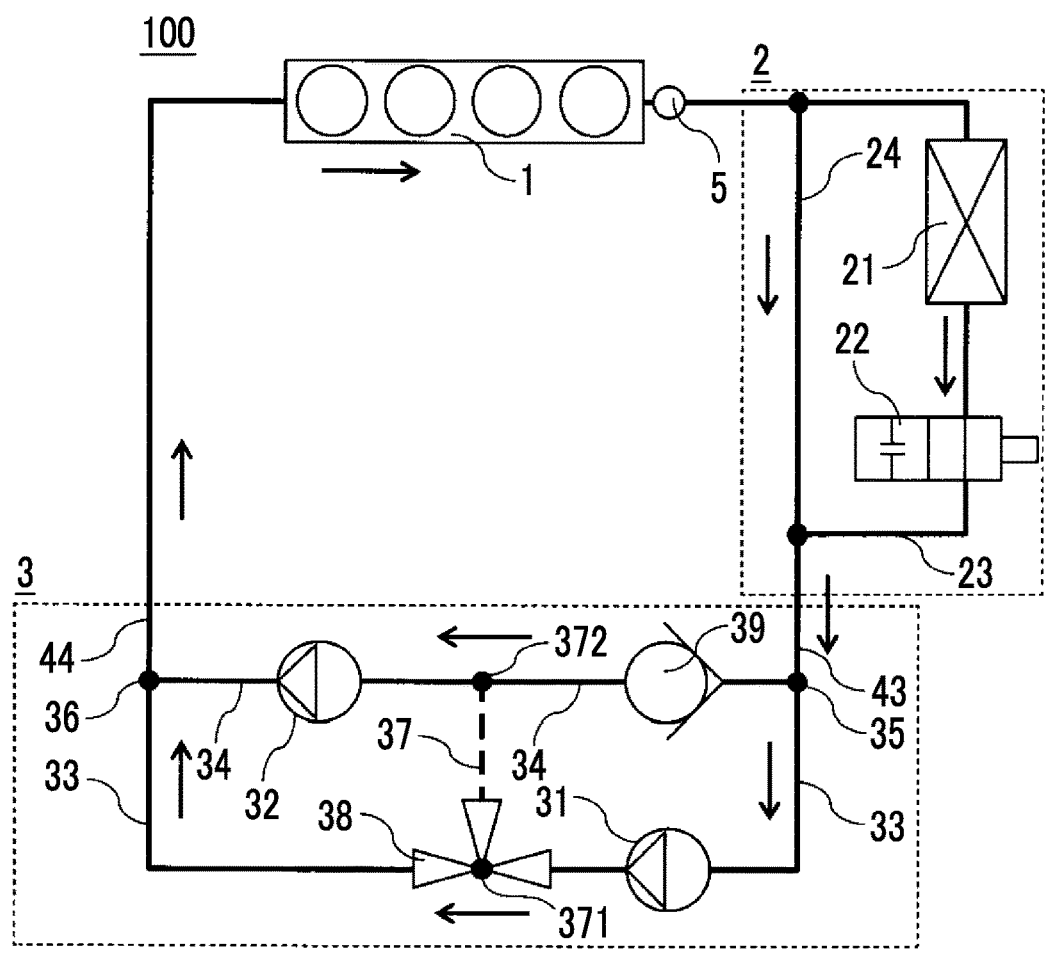
FIG. 6 is a schematic diagram illustrating the state of the cooling device for an internal combustion engine in a case where the coolant is circulated through a radiator and a bypass water passage in the first example of the present disclosure.
Figure 7:
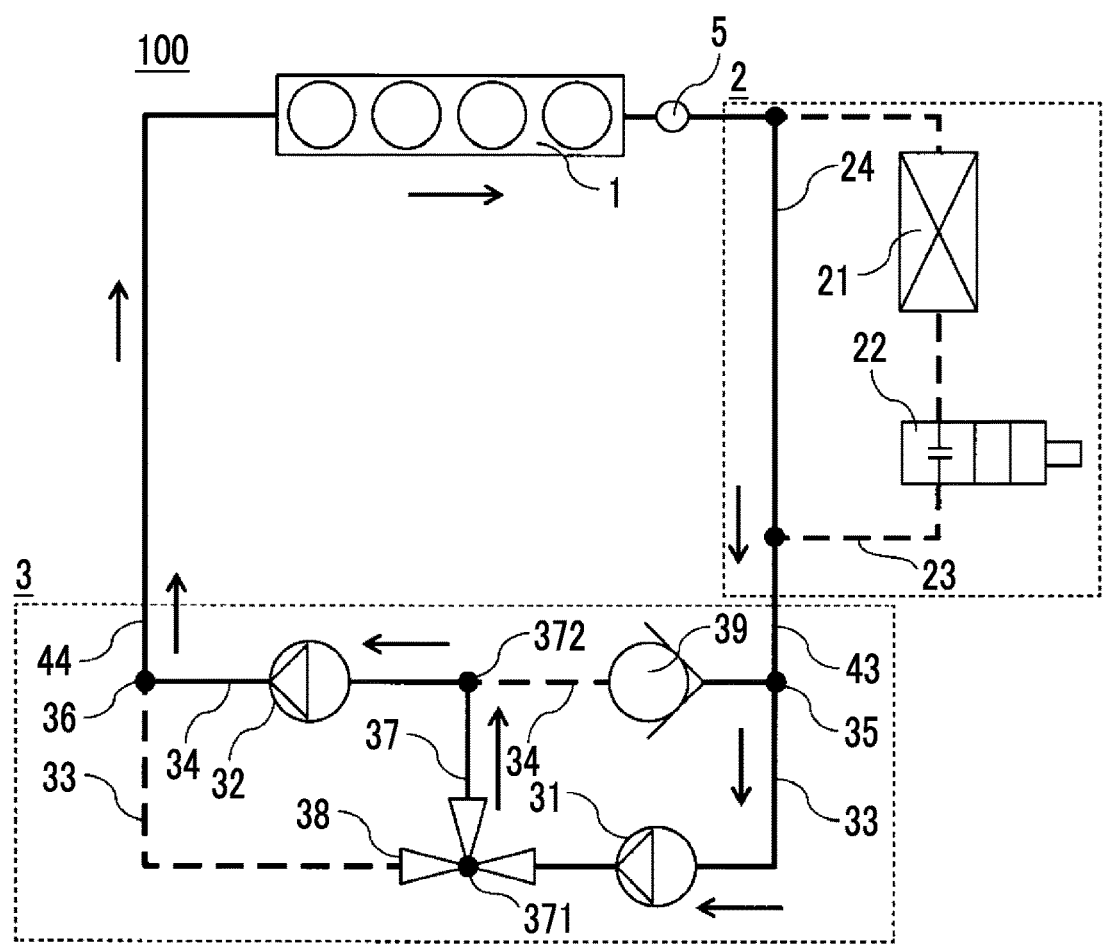
FIG. 7 is a schematic diagram illustrating the state of the cooling device for an internal combustion engine in a case where the coolant is circulated merely through the bypass water passage in the first example of the present disclosure.

FIG. 6 is a schematic diagram of the cooling device 100 for an internal combustion engine at a time when the thermostat 22 is open. FIG. 7 is a schematic diagram of the cooling device 100 for an internal combustion engine at a when the thermostat 22 is closed. The arrows in FIGS. 7 and 8 represent the direction in which the coolant flows, the solid lines in FIGS. 7 and 8 represent a state where the coolant flows, and the dashed lines in FIGS. 7 and 8 represent a state where the coolant does not flow.

As illustrated in FIG. 6, the path on which the thermostat 22 is open is likely to allow the coolant to flow and a flow path resistance R1 of the path of the coolant is relatively small as the cross-sectional area of the flow path of the heat exchange portion 2 is the total value of the cross-sectional areas of the heat exchange water passage 23 and the bypass water passage 24. In contrast, as illustrated in FIG. 7, the path on which the thermostat 22 is closed is unlikely to allow the coolant to flow and a flow path resistance Rh of the path of the coolant is relatively large as the cross-sectional area of the flow path of the heat exchange portion 2 is equal to the cross-sectional area of the bypass water passage 24. In other words, the flow path resistance R1 of the path of the coolant in FIG. 6 is smaller than the flow path resistance Rh of the path of the coolant in FIG. 7.

Figure 8:
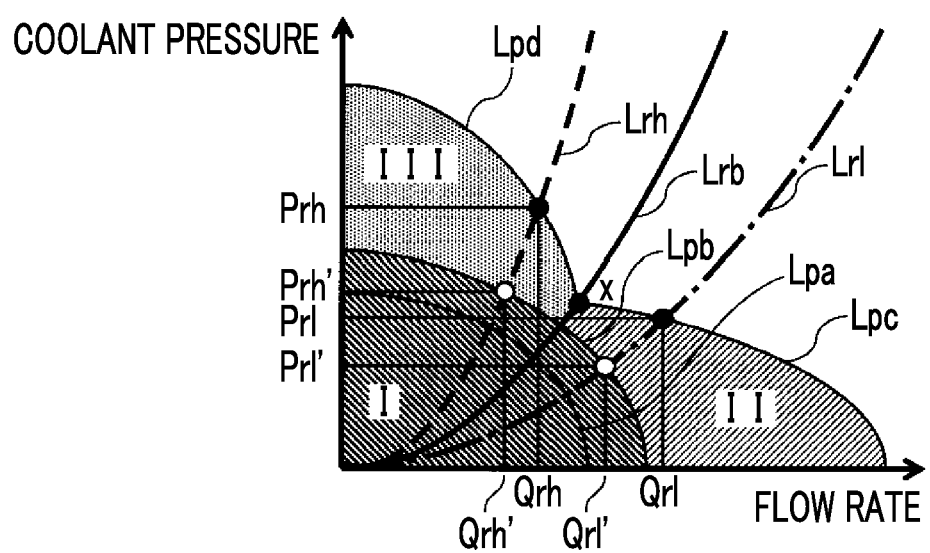
FIG. 8 is a graph showing a change in a pump connection method in accordance with a change in flow path resistance.

FIG. 8 is a graph showing the flow path resistance R of the path of the coolant corresponding to the switching state of the thermostat 22 and the dischargeable range of the pump portion 3 corresponding to the state of the pump portion 3. The resistance curve Lrl at a time when the thermostat 22 is open is represented by the chain line in FIG. 8. The resistance curve Lrh at a time when the thermostat 22 is closed is represented by the dashed line in FIG. 8. The flow path resistance R1 at a time when the thermostat 22 is open is smaller than the flow path resistance Rh at a time when the thermostat 22 is closed, and thus the position where the resistance curve Lrl is formed is lower than the position where the resistance curve Lrh is formed.

FIG. 8 shows the range that can be discharged by a pump which is capable of switching between a case where the pumps are connected in parallel and a case where the pumps are connected in series. In this example, a pump similar in characteristics to the pump WPA illustrated in FIGS. 4A to 5B is used as the first pump 31 and a pump similar in characteristics to the pump WPB illustrated in FIGS. 4A to 5B is used as the second pump 32.

In the example illustrated in FIG. 8, a region I represents the range that can be discharged by the second pump 32 larger in capacity than the first pump 31 being used alone. Likewise, a region II represents the range that can be discharged simply by the first pump 31 and the second pump 32 being connected in parallel and a region III represents the range that can be discharged simply by the first pump 31 and the second pump 32 being connected in series. The region I is the range in which the region A and the region B in FIGS. 3 to 5B are summed up, the region II is a part of the region C in FIG. 4B, and the region III is a part of the region D in FIG. 5B.

A relationship between the switching state of the thermostat 22 and the switching state of the pump portion 3 according to this example will be described with reference to FIG. 8. In this example, the resistance curve Lrl of the path of the coolant is represented by the chain line in FIG. 8 in a case where the thermostat 22 switches to a state where the coolant is circulated to the heat exchange water passage 23. At a time as described above, a maximum flow rate Qrl of the coolant at a time when both pumps of the pump portion 3 are connected in parallel is the flow rate of the intersection point between the resistance curve Lrl and the pump characteristic curve Lpc at a time when the pumps are connected in parallel. A maximum flow rate Qrl' of the coolant at a time when both pumps of the pump portion 3 are connected in series is the flow rate of the intersection point between the resistance curve Lrl and the pump characteristic curve Lpb at a time when the pump is used alone. The maximum flow rate Qrl at a time when both pumps are connected in parallel exceeds the maximum flow rate Qrl' at a time when both pumps are connected in series. In other words, in a case where the thermostat 22 switches to a state where the coolant is circulated to the heat exchange water passage 23, the flow rate of the coolant can be effectively increased by both pumps being connected in parallel.

In this example, the resistance curve Lrh of the path of the coolant is represented by the dashed line in FIG. 8 in a case where the thermostat 22 switches to a state where the coolant is not circulated to the heat exchange water passage 23. At a time as described above, a maximum flow rate Qrh' of the coolant at a time when both pumps of the pump portion 3 are connected in parallel is the flow rate of the intersection point between the resistance curve Lrh and the pump characteristic curve Lpb at a time when the pump is used alone. A maximum flow rate Qrh of the coolant at a time when both pumps of the pump portion 3 are connected in series is the flow rate of the intersection point between the resistance curve Lrh and the pump characteristic curve Lpd at a time when the pumps are connected in series. The maximum flow rate Qrh' at a time when both pumps are connected in parallel is smaller than the maximum flow rate Qrh at a time when both pumps are connected in series. In other words, in a case where the thermostat 22 switches to a state where the coolant is not circulated to the heat exchange water passage 23, the flow rate of the coolant can be effectively increased by both pumps being connected in series.

To summarize the above, when the thermostat 22 switches such that the coolant is circulated to the heat exchange water passage 23, the flow rate of the coolant can be effectively increased by both pumps of the pump portion 3 being connected in parallel, that is, by the three-way valve 38 switching to the first switching position. When the thermostat 22 switches such that the coolant is not circulated to the heat exchange water passage 23, the flow rate of the coolant can be effectively increased by both pumps of the pump potion 3 being connected in series, that is, by the three-way valve 38 switching to the second switching position. Accordingly, in this example, whether to connect both pumps of the pump portion 3 in parallel or in series switches in accordance with the switching state of the thermostat 22.

In this example, the control unit 200 determines whether or not the thermostat 22 switches based on a coolant temperature Tw of the coolant obtained by the coolant temperature sensor 5. The control unit 200 determines that the thermostat 22 is in the valve open state when, for example, the coolant temperature Tw obtained by the coolant temperature sensor 5 is equal to or higher than a valve opening temperature Twc of the thermostat 22 determined in advance.

Whether to connect both pumps of the pump portion 3 in parallel or in series can be determined based on the flow path resistance R of the path of the coolant as well as the method described above. The intersection point between the pump 32 are connected in parallel and the pump characteristic curve in a case where the first pump 31 and the second pump 32 are connected in series is an intersection point x. In this example, the first pump 31 and the second pump 32 are connected in parallel insofar as the flow rate Q and the water pressure P are positioned within the range below the resistance curve (that is, a range in which the flow rate is large or the water pressure is low) passing through the intersection point x (solid line Lrb in FIG. 8, hereinafter, referred to as a "reference resistance curve", the flow path resistance corresponding to the resistance curve will be referred to as a "reference flow path resistance Rc"). The first pump 31 and the second pump 32 may be connected in series insofar as the flow rate Q and the water pressure P are positioned within the range above the reference resistance curve (that is, a range in which the flow rate is small or the water pressure is high).

As described above, in the first example, the cooling device 100 for an internal combustion engine is provided with the pump portion 3 pumping the coolant of the internal combustion engine and the circulation water passage including the engine water passage of the internal combustion engine and connecting the pump portion 3 and the engine water passage to each other such that the coolant pumped from the pump portion 3 returns back to the pump portion 3 though the engine water passage of the internal combustion engine. The cooling device 100 for an internal combustion engine is provided with the radiator 21 (heat exchanger) performing heat exchange with the coolant and the heat exchange water passage 23 disposed in parallel to the bypass water passage 24 (at least a part of the circulation water passage), the radiator 21 being disposed on the heat exchange water passage 23. The cooling device 100 for an internal combustion engine is provided with the thermostat 22 (water passage switching device) switching between a state where the coolant is circulated to the heat exchange water passage 23 and a state where the coolant is not circulated to the heat exchange water passage 23 and the control unit 200 (control device) controlling the pump portion 3.

The pump portion 3 includes the first pump 31, the second pump 32, and the three-way valve 38 (pump switching device) switching between a state where the first pump 31 and the second pump 32 are connected in parallel and a state where the first pump 31 and the second pump 32 are connected in series. When the thermostat 22 switches to a state where the coolant is circulated to the heat exchange water passage 23 and the coolant is circulated to the circulation water passage and the heat exchange water passage 23, the control unit 200 controls the three-way valve 38 such that the first pump 31 and the second pump 32 are connected in parallel. When the thermostat 22 switches to a state where the coolant is not circulated to the heat exchange water passage 23 and the coolant is circulated to the circulation water passage alone, the control unit 200 controls the three-way valve 38 such that the first pump 31 and the second pump 32 are connected in series.

When the coolant is circulated to the heat exchange water passage 23 and the bypass water passage 24, the flow path resistance of the path of the coolant is small, and thus the flow rate can be increased by the first pump 31 and the second pump 32 being connected in parallel. When the coolant is circulated to the bypass water passage 24 alone, the flow path resistance of the path of the coolant is large, and thus the discharge pressure of the pump portion 3 can be increased and the flow rate of the coolant discharged by the pump portion 3 can be increased by the first pump 31 and the second pump 32 being connected in series. In other words, the flow rate of the coolant can be increased without an increase in the volume of each pump of the pump portion 3.

As described above, in the first example, the thermostat 22 (water passage switching device) is disposed on the heat exchange water passage 23 and switches between the valve open state and the valve closed state in accordance with the coolant temperature of the coolant. The thermostat 22 allows the coolant to circulate to the heat exchange water passage 23 when the thermostat 22 is in the valve open state and stops the circulation of the coolant to the heat exchange water passage 23 when the thermostat 22 is in the valve closed state.

The flow rate of the coolant discharged from the pump portion 3 can be increased by the pump portion 3 being connected in parallel when the thermostat 22 is in the valve open state, that is, when the heat exchange of the coolant is performed by the radiator 21 being used. Accordingly, the heat exchange of the coolant can be efficiently performed.

In this example, the maximum flow rate that can be output by the three-way valve 38 (pump switching device) connecting the first pump 31 and the second pump 32 in parallel to each other exceeds the maximum flow rate that can be output by the three-way valve 38 connecting the first pump 31 and the second pump 32 in series to each other when the thermostat 22 (water passage switching device) switches to a state where the coolant is circulated to the heat exchange water passage 23 (first branch water passage). When the thermostat 22 switches to a state where the coolant is not circulated to the heat exchange water passage 23, the maximum flow rate that can be output by the three-way valve 38 connecting the first pump 31 and the second pump 32 in parallel to each other is smaller than the maximum flow rate that can be output by the three-way valve 38 connecting the first pump 31 and the second pump 32 in series to each other.

As described above, the pumps being connected in parallel is advantageous when a large flow rate is needed for the path of the coolant and the pumps being connected in series is advantageous when a high water pressure is needed for the path of the coolant. Since the state of connection between both pumps of the pump portion 3 switches between parallel and serial in accordance with the switching state of the thermostat 22, the flow rates of the pumps can be increased and the volumes of the pumps can be minimized at the same time.

In this example, whether to connect both pumps of the pump portion 3 in parallel or in series may also be determined based on the flow path resistance R of the path of the coolant. In other words, in this example, the circulation water passage and the heat exchange water passage 23 are designed such that the flow path resistance R of the circulation water passage and the heat exchange water passage 23 in the path on which the thermostat 22 is open is equal to or less than the reference flow path resistance Rc and the flow path resistance R of the circulation water passage in the path on which the thermostat 22 is closed exceeds the reference flow path resistance Rc.

Although the flow path resistance R of the path of the coolant is compared to the reference flow path resistance Rc in this example, the flow path resistance R of the heat exchange portion 2 may also be compared to the reference flow path resistance Rc corresponding to the heat exchange portion 2.

In other words, in this example, the curve that represents the relationship between the maximum flow rate and maximum water pressure which can be output by the pump portion 3 in a state where the first pump 31 and the second pump 32 are connected in parallel will be referred to as a parallel characteristic curve. The curve that represents the relationship between the maximum flow rate and maximum water pressure which can be output by the pump portion 3 in a state where the first pump 31 and the second pump 32 are connected in series will be referred to as a series characteristic curve.

The curve that represents the relationship between the flow rate and the water pressure at a time when the flow path resistance R of the path of the coolant is any value will be referred to as the resistance curve, and the flow path resistance at a time when the resistance curve passes through the intersection point x between the parallel characteristic curve and the series characteristic curve will be referred to as the reference flow path resistance Rc. In this case, the circulation water passage and the heat exchange water passage 23 are configured such that the flow path resistance of the path of the coolant is equal to or less than the reference flow path resistance Rc when the thermostat 22 (water passage switching device) switches to a state where the coolant is circulated to the heat exchange water passage 23. The circulation water passage and the heat exchange water passage 23 are configured such that the flow path resistance of the path of the coolant exceeds the reference flow path resistance Rc when the thermostat 22 switches to a state where the coolant is not circulated to the heat exchange water passage 23.

In a case where the flow path resistance R of the path of the coolant is equal to or less than the reference flow path resistance Rc, the resistance curve is the chain line Lrl in FIG. 8. Accordingly, the amount of the coolant discharged from the pump portion 3 can be effectively increased by the first pump 31 and the second pump 32 being connected in parallel. In a case where the flow path resistance R of the path of the coolant exceeds the reference flow path resistance Rc, the resistance curve is the dashed line Lrh in FIG. 8, and thus the amount of the coolant discharged from the pump portion 3 can be effectively increased by the first pump 31 and the second pump 32 being connected in series. In a case where the circulation water passage is formed as in this example, the magnitude relationship between the flow path resistance R of the path of the coolant and reference flow path resistance Rc varies with the state of the thermostat 22, and thus the amount of the coolant discharged from the pump portion 3 can be effectively increased by the switching state of the pump portion 3.

In the first example, the pump portion 3 is provided with the first pump 31 pumping the coolant and the second pump 32 pumping the coolant. The pump portion 3 is provided with the inlet water passage 43 into which the coolant flows, the first water passage 33 on which the first pump 31 is disposed, and the second water passage 34 on which the second pump 32 is disposed, the first water passage 33 and the second water passage 34 communicating with the inlet water passage 43 at the branch point 35 and being disposed in parallel to each other. The pump portion 3 is provided with the outlet water passage 44 communicating with each of the first water passage 33 and the second water passage 34 at the confluence point 36, the coolant flowing out from the outlet water passage 44, and the inter-pump water passage 37 allowing the water passage of the first water passage 33 that is on the coolant discharge side of the first pump 31 and the water passage of the second water passage 34 that is on the coolant suction side of the second pump 32 to communicate with each other. The pump portion 3 is provided with the first check valve 39 disposed on the second water passage 34 between the second connection portion 372 (connection portion between the second water passage and the inter-pump water passage) and the branch point 35. The first pump 31 is disposed on the first water passage 33 between the first connection portion 371 (connection portion between the first water passage and the inter-pump water passage) and the branch point 35. The second pump 32 is disposed on the second water passage 34 between the second connection portion 372 and the confluence point 36. In the first example, the pump switching device is the three-way valve 38 disposed in the first connection portion 371.

The three-way valve 38 is a three-way valve configured to selectively switch between the first switching position at which the coolant is circulated to the first water passage 33 as it is without flowing into the inter-pump water passage 37 after flowing through the first water passage 33 and the second switching position at which the coolant is allowed to flow into the inter-pump water passage 37 without circulating to the first water passage 33 as it is after flowing through the first water passage 33.

The control unit 200 (control device) switches the three-way valve 38 to the first switching position when the first pump 31 and the second pump 32 are connected in parallel and switches the three-way valve 38 to the second switching position when the first pump 31 and the second pump 32 are connected in series.

As described above, the first example of the present disclosure, the first pump 31 and the second pump 32 can switch by a simple configuration by the three-way valve 38 and the first check valve 39 being used.

Figure 9:
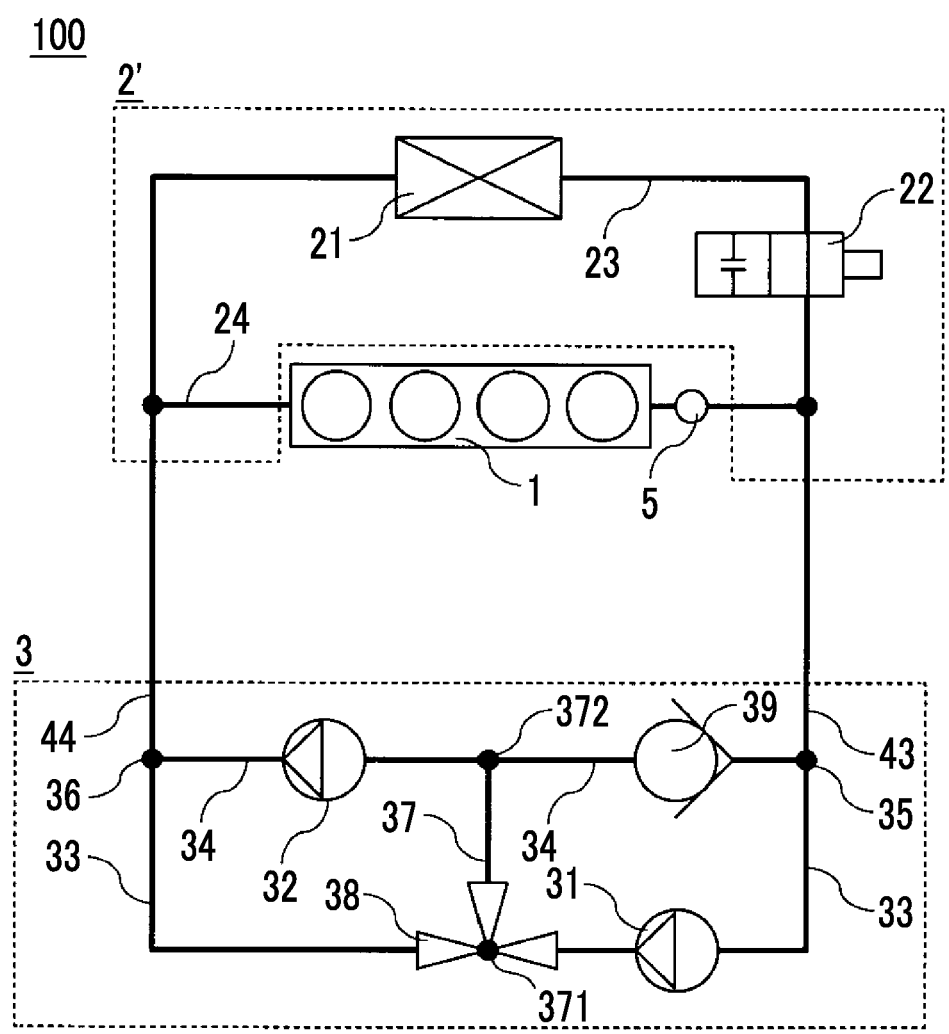
FIG. 9 is a schematic diagram illustrating a cooling device for an internal combustion engine according to a second example of the present disclosure.

A second example of the present disclosure will be described. FIG. 9 is a schematic diagram illustrating a cooling device for an internal combustion engine according to the second example. In the cooling device according to the second example, a heat exchange portion 2' different in configuration from the heat exchange portion 2 used in the first example is used. In other words, in the second example, the engine body 1 is disposed on the bypass water passage 24 as illustrated in FIG. 9 whereas the heat exchange portion 2 according to the first example is disposed on the downstream side of the engine body 1 in the circulation direction of the coolant as illustrated in FIG. 1. In the second example, the water passage that reaches the pump portion 3 again through the bypass water passage 24 and the engine water passage of the engine body 1 after starting from the pump portion 3 will be referred to as the "circulation water passage". Accordingly, in this example, it can be said that the heat exchange water passage 23 is disposed in parallel to the entire circulation water passage or almost the entire circulation water passage. In the following description, description of parts overlapping with the first example will be omitted.

Also in the second example, the flow path resistance R of the path of the coolant varies depending on whether or not the thermostat 22 is open. Once the thermostat 22 is opened in a case where the coolant temperature Tw is equal to or higher than the valve opening temperature Twc, for example, the coolant flows to both the heat exchange water passage 23 and the bypass water passage 24. Once the thermostat 22 is closed in a case where the coolant temperature Tw is lower than the valve opening temperature Twc, the coolant flows simply to the bypass water passage 24. Accordingly the flow path resistance R decreases as the cross-sectional area of the flow path of the heat exchange portion 2' increases when the thermostat 22 is open, and the flow path resistance R increases as the cross-sectional area of the flow path of the heat exchange portion 2' decreases when the thermostat 22 is closed.

In the second example, the circulation water passage and the heat exchange water passage 23 are designed such that the flow path resistance R at a time when the thermostat 22 is open is equal to or less than the flow path resistance Rc and the flow path resistance R at a time when the thermostat 22 is closed exceeds the flow path resistance Rc. Accordingly, whether or not the flow path resistance R of the path of the coolant is equal to or greater than the flow path resistance Rc can be determined by the opening and closing of the thermostat 22 being determined. When the thermostat 22 is open, the three-way valve 38 is put into the first switching position and the first pump 31 and the second pump 32 are connected in parallel. When the thermostat 22 is closed, the three-way valve 38 is put into the second switching position and the first pump 31 and the second pump 32 are connected in series.

As described above, in the second example of the present disclosure, the flow rate Q of the coolant that can be output by the pump portion 3 can be increased, although the engine body 1 is disposed on the bypass water passage 24, by the method by which the first pump 31 and the second pump 32 are connected to each other switching between parallel and serial.

Although the engine body 1 is disposed on the bypass water passage 24 in the second example of the present disclosure, a heat exchanger (such as a heater core) through which the coolant circulates at all times may also be disposed instead of the engine body 1 with the position of the engine body 1 changed to another position on the circulation water passage.

Figure 10:
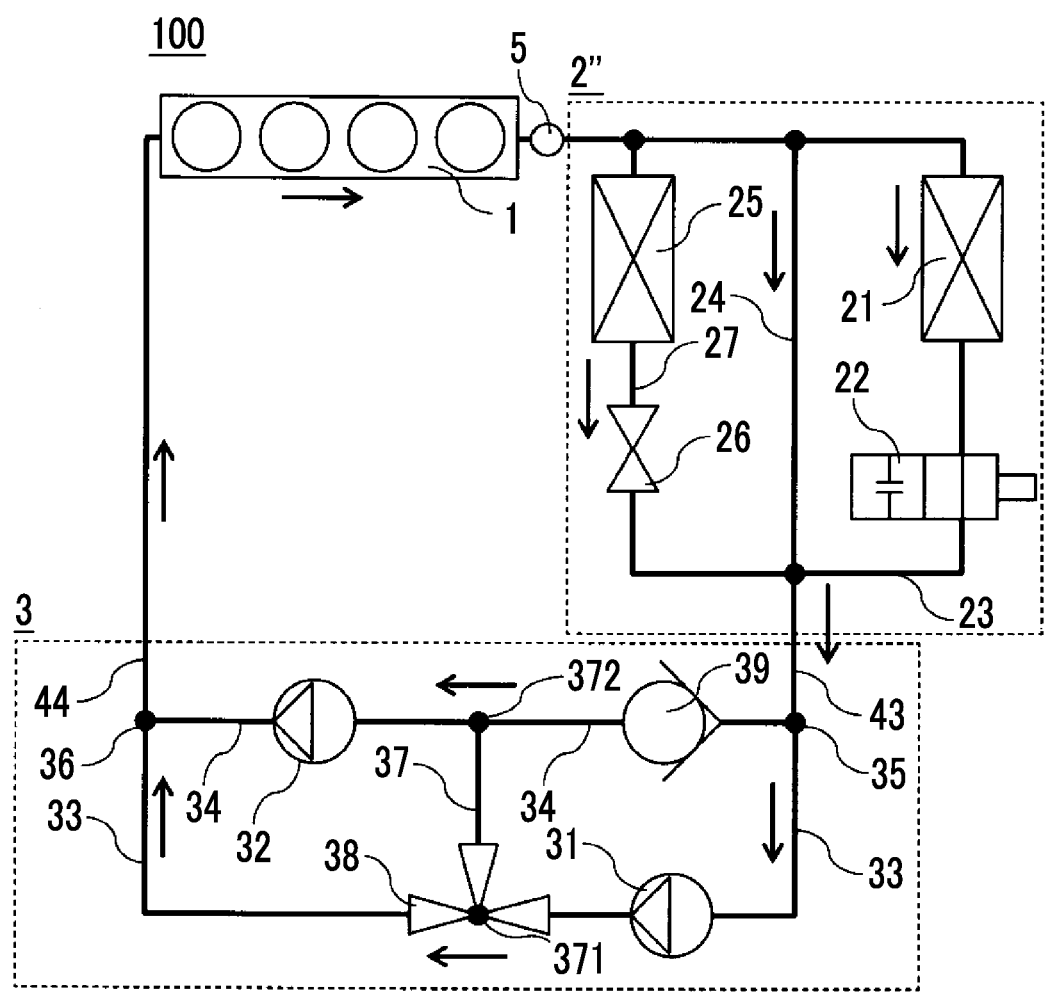
FIG. 10 is a schematic diagram illustrating a cooling device for an internal combustion engine according to a third example of the present disclosure.

A third example of the present disclosure will be described. FIG. 10 is a schematic diagram illustrating a cooling device for an internal combustion engine according to the third example. In the cooling device according to the third example, a heat exchange portion 2" different in configuration from the heat exchange portion 2 used in the first example is used. In other words, in the third example, a second heat exchange water passage 27 on which an EGR cooler 25 and a heat exchange on-off valve 26 are disposed is disposed in parallel to the first heat exchange water passage 23 and the bypass water passage 24 as illustrated in FIG. 10. In the third example, the water passage that reaches the pump portion 3 again through the engine water passage of the engine body 1 and the bypass water passage 24 after starting from the pump portion 3 will be referred to as the circulation water passage. In the following description, description of parts overlapping with the first example will be omitted.

The EGR cooler 25 is disposed on an EGR passage for circulating exhaust gas from an exhaust pipe to an intake pipe of the internal combustion engine. The EGR cooler 25 is a heat exchanger for cooling the temperature of the exhaust gas with the coolant. An exhaust passage through which the exhaust gas circulates and a coolant passage through which the coolant circulates are disposed via a fin in the EGR cooler 25. The temperature of the exhaust gas is reduced by the coolant depriving the exhaust gas of heat.

The heat exchange on-off valve 26 is disposed on the downstream side of the EGR cooler 25. The heat exchange on-off valve 26 is capable of selectively switching between a state where the coolant is circulated to the EGR cooler 25 and the second heat exchange water passage 27 (state where the valve is open) and a state where the coolant is not circulated to the EGR cooler 25 and the second heat exchange water passage 27 (state where the valve is closed). In this example, the heat exchange on-off valve 26 is controlled by receiving a signal from the control unit 200.

In the third example, each of the thermostat 22 and the heat exchange on-off valve 26 has two states, one being the valve open state and the other one being the valve closed state, and thus the path of the coolant is present in four different types. When both the thermostat 22 and the heat exchange on-off valve 26 are in the valve open state, the water passage switching device switches to a state where the coolant is circulated to the heat exchange water passage and the path of the coolant has the smallest flow path resistance among those of the four types, and thus the first pump 31 and the second pump 32 are connected in parallel. When both the thermostat 22 and the heat exchange on-off valve 26 are in the valve closed state, the water passage switching device switches to a state where the coolant is not circulated to the heat exchange water passage and the path of the coolant has the largest flow path resistance among those of the four types, and thus the first pump 31 and the second pump 32 are connected in series. In a case where merely one of the thermostat 22 and the heat exchange on-off valve 26 is in the valve open state, however, the path of the coolant has a moderate flow path resistance, and thus the method by which the first pump 31 and the second pump 32 are connected to each other cannot be easily determined.

In this example, the control unit 200 determines the pump connection method by determining which one of the region I, the region II, and the region III in FIG. 8 includes a requested flow rate Q_t and a requested water pressure P_t with respect to the pump portion 3. In other words, when the requested flow rate Q_t and the requested water pressure P_t are included in the region I, the control unit 200 drives the single pump while controlling the three-way valve 38 such that both pumps of the pump portion 3 are connected in parallel. When the requested flow rate Q_t and the requested water pressure P_t are included in the region II, the control unit 200 drives both pumps while connecting both pumps of the pump portion 3 in parallel to each other. When the requested flow rate Q_t and the requested water pressure P_t are included in the region III, the control unit 200 controls the three-way valve 38 such that both pumps are connected in series. Assuming that the thermostat 22 is in the valve open state, the heat exchange on-off valve 26 is in the valve closed state, and the requested flow rate Q_t and the requested water pressure P_t with respect to the pump portion 3 are included in the region II for example, the first pump 31 and the second pump 32 are connected in parallel. Assuming that the thermostat 22 is in the valve closed state, the heat exchange on-off valve 26 is in the valve open state, and the requested flow rate Q_t and the requested water pressure P_t with respect to the pump portion 3 are included in the region III, the first pump 31 and the second pump 32 are connected in series.

In the third example, the control unit 200 may also store the method by which both pumps of the pump portion 3 are connected to each other with respect to the state of the thermostat 22 and the state of the heat exchange on-off valve 26. For example, the method for connecting the first pump 31 and the second pump 32 to each other may switch in response to the states of the thermostat 22 and the heat exchange on-off valve 26 with the pumps being connected in parallel merely when the thermostat 22 and the heat exchange on-off valve 26 are in the valve open state and the pumps being connected in series in the other cases being stored in the control unit 200.

In the third example, the flow path resistance R may also be compared to the reference flow path resistance Rc with the flow path resistance R measured in advance for each coolant path. In other words, the first pump 31 and the second pump 32 may be connected in parallel in a case where the flow path resistance R of the path of the coolant measured in advance is equal to or less than the reference flow path resistance Rc and the first pump 31 and the second pump 32 may be connected in series in a case where the flow path resistance R of the path of the coolant exceeds the reference flow path resistance Rc.

According to this example, the heat exchanger includes the radiator 21 (first heat exchanger) and the EGR cooler 25 (second heat exchanger) as described above. The heat exchange water passage includes the first heat exchange water passage 23 disposed in parallel to at least a part of the circulation water passage and the second heat exchange water passage 27 disposed in parallel to at least a part of the circulation water passage, the radiator 21 being disposed on the first heat exchange water passage 23 and the EGR cooler 25 being disposed on the second heat exchange water passage 27. In addition, the water passage switching device includes the thermostat 22 (first water passage switching device) switching between a state where the coolant is circulated to the first heat exchange water passage 23 and a state where the coolant is not circulated to the first heat exchange water passage 23 and the heat exchange on-off valve 26 (second water passage switching device) switching between a state where the coolant is circulated to the second heat exchange water passage 27 and a state where the coolant is not circulated to the second heat exchange water passage 27.

In this example, the water passage switching device switches to a state where the coolant is circulated to the heat exchange water passage when the thermostat 22 switches to a state where the coolant is circulated to the first heat exchange water passage 23 and the heat exchange on-off valve 26 switches to a state where the coolant is circulated to the second heat exchange water passage 27. Accordingly in this example, the control unit 200 (control device) connects the first pump and the second pump in parallel to each other when the thermostat 22 and the heat exchange on-off valve 26 switch to a state where the coolant is circulated to both the first heat exchange water passage 23 and the second heat exchange water passage 27.

In this example, the water passage switching device switches to a state where the coolant is not circulated to the heat exchange water passage when the thermostat 22 switches to a state where the coolant is not circulated to the first heat exchange water passage 23 and the heat exchange on-off valve 26 switches to a state where the coolant is not circulated to the second heat exchange water passage 27. Accordingly, in this example, the control unit 200 connects the first pump and the second pump in series to each other when the thermostat 22 and the heat exchange on-off valve 26 switch to a state where the coolant is circulated neither to the first heat exchange water passage 23 nor to the second heat exchange water passage 27.

The control unit 200 (control device) stores, as the region II (first region), the region of the flow rate and the water pressure that can be output simply by the first pump 31 and the second pump 32 being connected in parallel when the thermostat 22 and the heat exchange on-off valve 26 switch to a state where the coolant is circulated to either the first heat exchange water passage 23 or the second heat exchange water passage 27. The control unit 200 stores, as the region III (second region), the region of the flow rate Q_t and the water pressure P_t that can be output simply by the first pump 31 and the second pump 32 being connected in series when the thermostat 22 and the heat exchange on-off valve 26 switch to a state where the coolant is circulated to either the first heat exchange water passage 23 or the second heat exchange water passage 27. The control unit 200 calculates the requested flow rate Q_t to the pump portion 3 and the requested water pressure P_t to the pump portion determined by the requested flow rate Q_t, the state of the thermostat 22, and the state of the heat exchange on-off valve 26. In a case where the requested flow rate Q_t and the requested water pressure P_t are included in the region II, the control unit 200 controls the three-way valve 38 (pump switching device) such that the first pump 31 and the second pump 32 are connected in parallel. In a case where the requested flow rate Q_t and the requested water pressure P_t are included in the region III, the control unit 200 controls the three-way valve 38 such that the first pump 31 and the second pump 32 are connected in series.

According to the example described above, whether to connect the first pump 31 and the second pump 32 in parallel or in series is determined based on the requested flow rate Q_t and the requested water pressure P_t of the pump portion determined in accordance with the path of the coolant. Accordingly, whether to connect the first pump 31 and the second pump 32 in parallel or in series can be accurately determined even in a case where the path of the coolant has three or more types.

Figure 11:
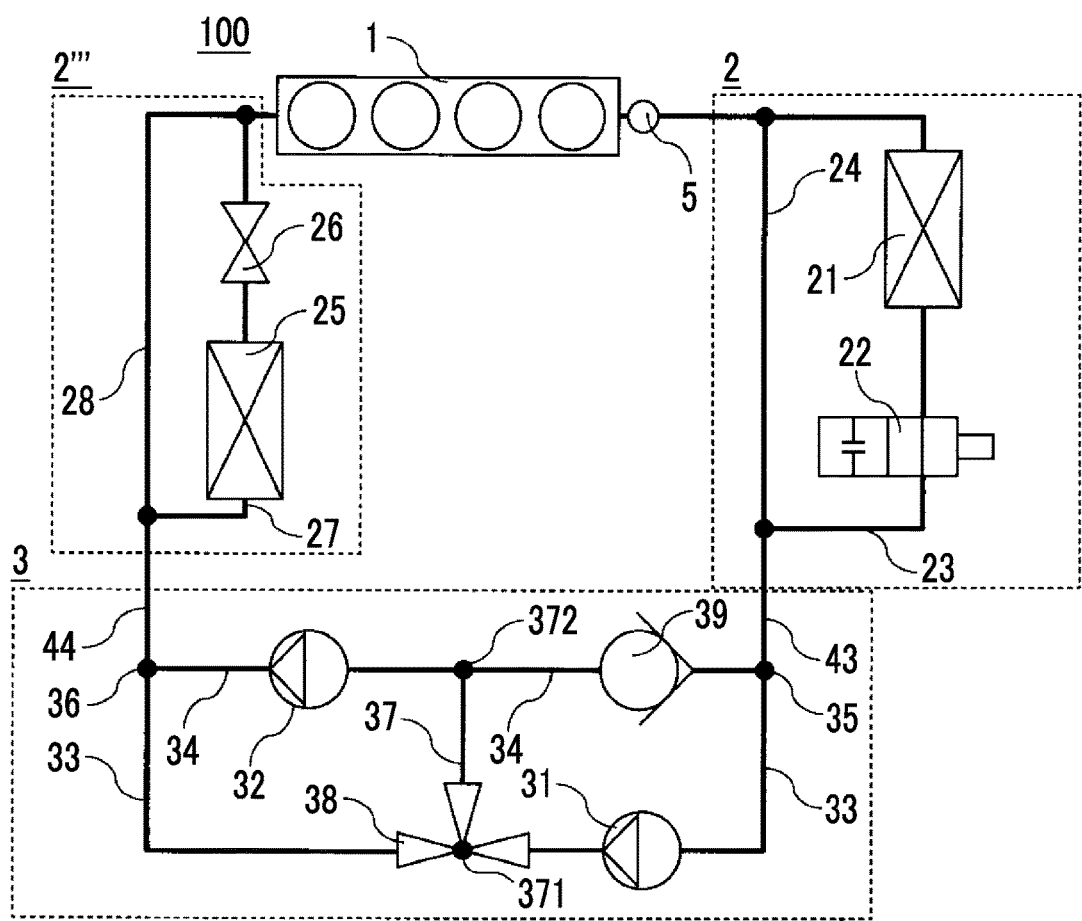
FIG. 11 is a schematic diagram illustrating a cooling device for an internal combustion engine according to a fourth example of the present disclosure.

A fourth example of the present disclosure will be described. FIG. 11 is a schematic diagram illustrating a cooling device for an internal combustion engine according to the fourth example. In the cooling device according to the first example, the heat exchange portion 2 is disposed merely on the downstream side of the engine body 1 in the circulation direction of the coolant as illustrated in FIG 1. In the fourth example, in contrast, a second heat exchange portion 2''' is disposed on the upstream side of the engine body 1 in the circulation direction of the coolant and the heat exchange portion 2 is disposed on the downstream side in the circulation direction of the coolant as illustrated in FIG. 11. In this example, the water passage through which the coolant discharged from the pump portion 3 is circulated back to the pump portion 3 through a second bypass water passage 28, the engine water passage of the engine body 1, and the first bypass water passage 24 will be referred to as the circulation water passage.

The second heat exchange portion 2''' is a device for performing heat exchange between the coolant and exhaust gas. In this example, the second heat exchange portion 2''' is provided with the EGR cooler 25, the heat exchange on-off valve 26, the second heat exchange water passage 27, and the second bypass water passage 28. The EGR cooler 25 and the heat exchange on-off valve 26 are disposed on the second heat exchange water passage 27, and the second bypass water passage 28 is disposed to bypass the EGR cooler 25 and the heat exchange on-off valve 26.

When the heat exchange on-off valve 26 is open, the coolant is circulated to the second heat exchange water passage 27 and the second bypass water passage 28, and thus the cross-sectional area of the flow path of the second heat exchange portion 2''' increases and the flow path resistance R of the path of the coolant relatively decreases. When the heat exchange on-off valve 26 is closed, in contrast, the coolant is circulated merely to the second bypass water passage 28, and thus the cross-sectional area of the flow path of the second heat exchange portion 2''' decreases and the flow path resistance R of the path of the coolant relatively increases.

In the fourth example, the flow path resistance R relating to the path of the coolant from the confluence point 36 to the branch point 35 is determined in accordance with both the opening and closing state of the thermostat 22 of the heat exchange portion 2 and the opening and closing state of the heat exchange on-off valve 26 of the second heat exchange portion 2'''. In this example as well as the third example, the water passage switching device switches to a state where the coolant is circulated to the heat exchange water passage and the first pump 31 and the second pump 33 are connected in parallel when both the thermostat 22 and the heat exchange on-off valve 26 are in the valve open state. When both the thermostat 22 and the heat exchange on-off valve 26 are in the valve closed state, the water passage switching device switches to a state where the coolant is not circulated to the heat exchange water passage and the first pump 31 and the second pump 32 are connected in series. The pump connection method is determined by which one of the region I, the region II, and the region III in FIG. 8 includes the requested flow rate Q_t and the requested water pressure P_t with respect to the pump portion 3 being determined.

Although the EGR cooler 25 is used as the heat exchanger of the second heat exchange portion 2''' in this example, the heat exchanger of the second heat exchange portion 2''' may also be a heat exchanger for another application such as a heater core for performing heat exchange between the air inside a vehicle and the coolant.

Figure 12:
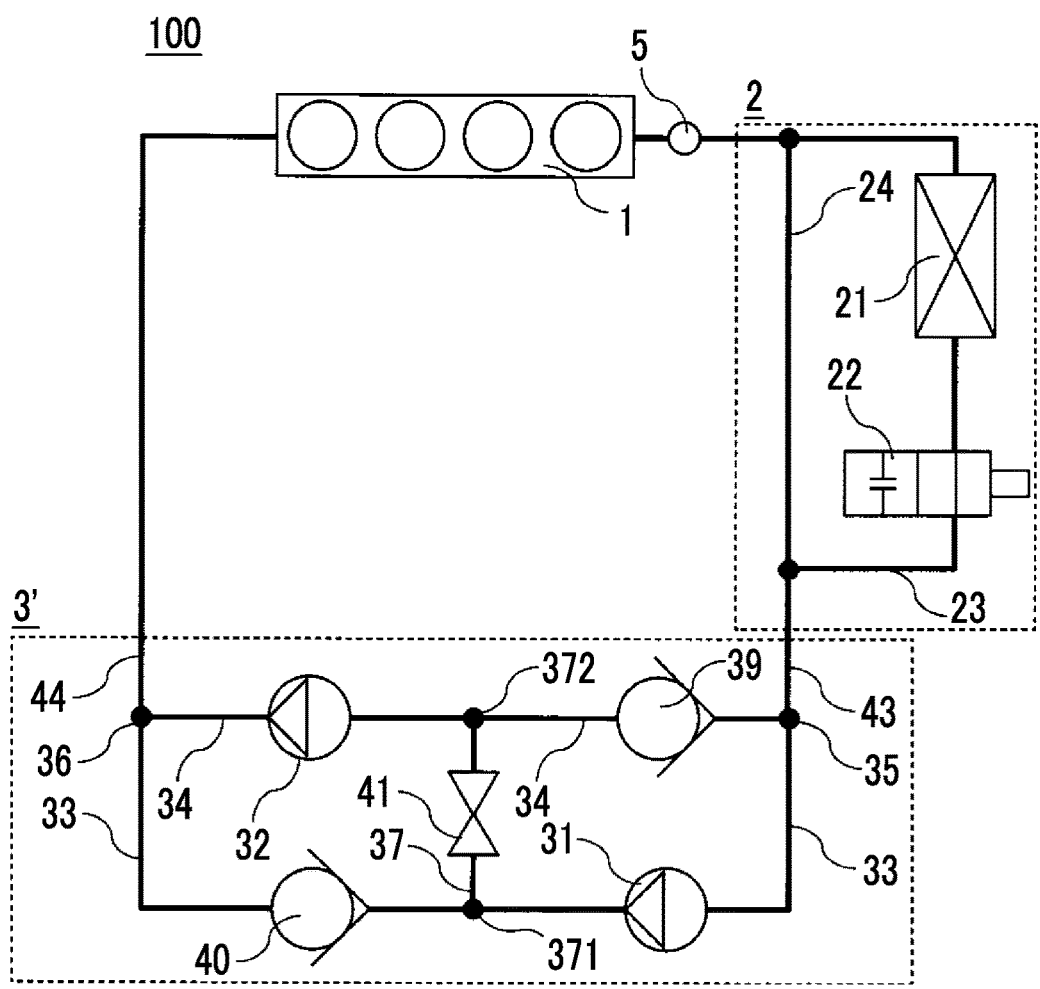
FIG. 12 is a schematic diagram illustrating a cooling device for an internal combustion engine according to a fifth example of the present disclosure.

A fifth example of the present disclosure will be described. FIG. 12 is a schematic diagram illustrating a cooling device for an internal combustion engine according to the fifth example. In the cooling device according to this example, a pump portion 3' different in configuration from the pump portion 3 used in the first example is used. In the following description, description of parts overlapping with the first example will be omitted.

As is apparent from comparison between FIGS. 1 and 12, the pump portion 3' according to the second example is provided with an on-off valve 41 instead of the three-way valve 38 illustrated in FIG. 1. In this example, a second check valve 40 is provided in addition to the check valve (hereinafter in this example, referred to as a "first check valve") 39 disposed on the second water passage 34. Although the three-way valve 38 controls the circulation of the coolant in the inter-pump water passage 37 in the first example, the circulation of the coolant in the inter-pump water passage 37 is controlled by the on-off valve 41 in the second example.

The second check valve 40 is a valve for circulating the coolant in one direction. In this example, the second check valve 40 is disposed on the first water passage 33 between the first connection portion 371 and the continence point 36. The second check valve 40 is configured to allow the circulation of the coolant flowing from the first connection portion 371 toward the continence point 36 and prohibit the circulation of the coolant from the confluence point 36 toward the second connection portion 372.

The on-off valve 41 is disposed on the inter-pump water passage 37. The on-off valve 41 is capable of switching between a first switching position at which the inter-pump water passage 37 is closed and a second switching position at which the inter-pump water passage 37 is opened. Accordingly, the coolant flowing into the first connection portion 371 is not circulated to the second connection portion 372 when the on-off valve 41 is at the first switching position, and the coolant flowing into the first connection portion 371 is circulated to the second connection portion 372 when the on-off valve 41 is at the second switching position. The on-off valve 41 is controlled by receiving a signal from the control unit 200.

In the fifth example, switching between a case where the first pump 31 and the second pump 32 are connected in series and a case where the first pump 31 and the second pump 32 are connected in parallel can be performed by the on-off valve 41 being controlled between the first switching position and the second switching position.

Specifically in a case where the on-off valve 41 switches to the first switching position, the circulation of the coolant to the inter-pump water passage 37 is blocked, and thus the first pump 31 and the second pump 32 are connected in parallel.

In a case where the on-off valve 41 switches to the second switching position, in contrast, the circulation of the coolant of the inter-pump water passage 37 is allowed, and thus the first pump 31 and the second pump 32 are connected in series. In a case where the first pump 31 and the second pump 32 are connected in series, the flow of the coolant from the first connection portion 371 toward the confluence point 36 via the first water passage 33 is limited by the second check valve 40, and thus the coolant discharged from the second pump 32 does not flow back toward the first connection portion 371.

The cooling device according to the fifth example is controlled in a similar way to the cooling device according to the first example. In other words, when the coolant temperature Tw is equal to or higher than the valve opening temperature Twc and the thermostat 22 is open, the flow path resistance R is equal to or less than the reference flow path resistance Rc, and thus the on-off valve 41 is controlled to reach the first switching position. As a result, the coolant is not circulated to the inter-pump water passage 37, and thus the first pump 31 and the second pump 32 are connected in parallel. When the coolant temperature Tw is lower than the valve opening temperature Twc and the thermostat 22 is closed, in contrast, the flow path resistance R exceeds the reference flow path resistance Rc, and thus the on-off valve 41 is controlled to reach the second switching position. As a result, the coolant is circulated to the inter-pump water passage 37, and thus the first pump 31 and the second pump 32 are connected in series.

As described above, in the fifth example of the present disclosure, the pump portion 3' is provided with the first pump 31 pumping the coolant and the second pump 32 pumping the coolant. The pump portion 3' is provided with the inlet water passage 43 into which the coolant flows, the first water passage 33 on which the first pump 31 is disposed, and the second water passage 34 on which the second pump 32 is disposed, the first water passage 33 and the second water passage 34 communicating with the inlet water passage 43 at the branch point 35 and being disposed in parallel to each other. In addition, the pump portion 3' is provided with the outlet water passage 44 communicating with each of the first water passage 33 and the second water passage 34 at the confluence point 36, the coolant flowing out from the outlet water passage 44, and the inter-pump water passage 37 allowing the water passage of the first water passage 33 that is on the coolant discharge side of the first pump 31 and the water passage of the second water passage 34 that is on the coolant suction side of the second pump 32 to communicate with each other. Furthermore, the pump portion 3' is provided with the first check valve 39 disposed on the second water passage 34 between the second connection portion 372 (connection portion between the second water passage and the inter-pump water passage) and the branch point 35, the second check valve 40 disposed on the first water passage 33 between the first connection portion 371 (connection portion between the first water passage and the inter-pump water passage) and the continence point 36, and the on-off valve 41 (pump switching device) disposed on the inter-pump water passage 37. The first pump 31 is disposed on the first water passage 33 between the first connection portion 371 and the branch point 35. The second pump 32 is disposed on the second water passage 34 between the second connection portion 372 and the confluence point 36. The pump switching device is the on-off valve 41 disposed on the inter-pump water passage 37 and is capable of switching between the first switching position at which the inter-pump water passage 37 is closed and the second switching position at which the inter-pump water passage 37 is opened.

The control unit 200 (control device) puts the on-off valve 41 into the first switching position when the first pump 31 (first pump) and the second pump 32 (second pump) are connected in parallel and puts the on-off valve 41 into the second switching position when the first pump 31 and the second pump 32 are connected in series.

In the fifth example of the present disclosure as described above, switching between the parallel connection and the serial connection of the first pump 31 and the second pump 32 can be performed by a simple configuration by the on-off valve 41 being used.

A plurality of specific control methods for the cooling device for an internal combustion engine according to each of the examples described above will be described below.

Figure 13:
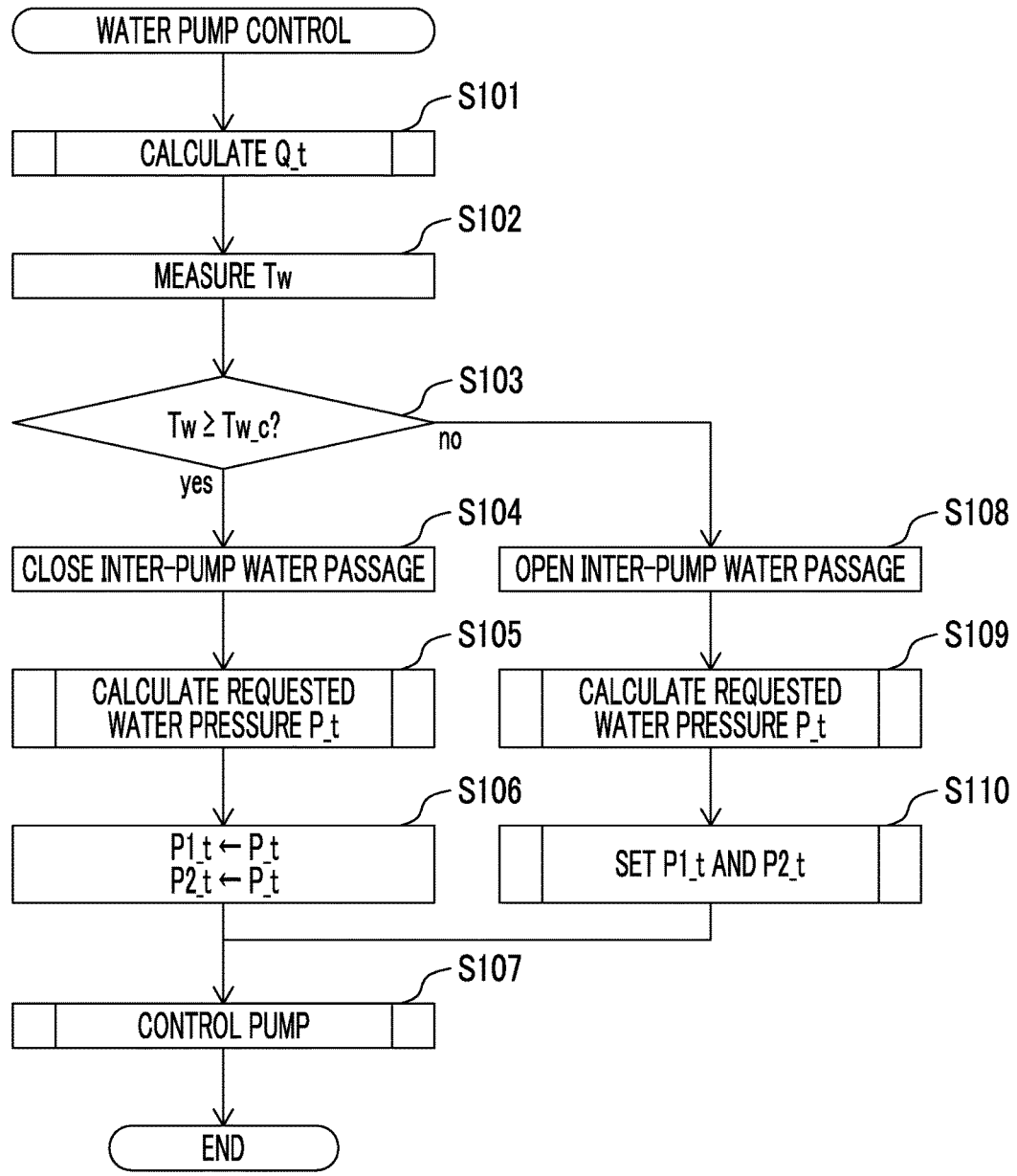
FIG. 13 is a flowchart illustrating a routine of a first control example of the present disclosure.

A first control method will be described first. This control method can be applied to each of the first to fifth examples described above. In the following description, a case where this control method is applied to the first example will be described as a representative example. FIG. 13 is a flowchart illustrating a routine for pump control relating to a first control example. This routine is repeatedly executed at regular intervals.

In Step S101, the control unit 200 calculates the requested flow rate to the pump. Specifically, in this control method, the control unit 200 calculates the degree of cooling of the engine body 1 based on an engine load. For example, the temperature of the engine body 1 increases as the engine load increases. Accordingly, for the temperature of the engine body 1 to reach a target temperature, the flow rate of the coolant should be increased as the engine load increases. In this regard, the requested flow rate $Q\_t$, which is a target value of the flow rate of the coolant, is calculated based on the engine load.

In Step S102, the control unit 200 measures the coolant temperature Tw by using the coolant temperature sensor 5. In Step S103, the control unit 200 determines whether or not the coolant temperature Tw is equal to or higher than the valve opening temperature Twc. In this control example, the valve opening temperature Twc is a temperature at which the thermostat 22 is opened. In a case where the control unit 200 determines that the coolant temperature Tw is equal to or higher than the valve opening temperature Twc and the thermostat 22 is open, the control unit 200 assumes that the flow path resistance R is equal to or less than the reference flow path resistance Rc and the control routine proceeds to Step S104 so that the first pump 31 and the second pump 32 are connected in parallel. In a case where the control unit 200 determines that the coolant temperature Tw is lower than the valve opening temperature Twc and the thermostat 22 is closed, the control unit 200 assumes that the flow path resistance R is smaller than the reference flow path resistance Rc and the control routine proceeds to Step S108 so that the first pump 31 and the second pump 32 are connected in series.

In Step S104, the control unit 200 outputs a signal for putting the three-way valve 38 into the first switching position. The three-way valve 38 closes the inter-pump water passage 37 upon receiving the signal from the control unit 200. As a result, the coolant discharged from the first pump 31 flows through the first water passage 33 as it is without flowing into the inter-pump water passage 37. Accordingly, the first pump 31 and the second pump 32 are connected in parallel.

In Step S105, the control unit 200 calculates the requested water pressure $P\_t$, which is a target water pressure for the pump portion 3 to discharge the requested flow rate $Q\_t$. In this control method, the control unit 200 stores the resistance curve in a case where the thermostat 22 is opened in advance. The control unit 200 calculates the requested water pressure $P\_t$ by applying the requested flow rate $Q\_t$ to the resistance curve.

In Step S106, the control unit 200 calculates a first requested water pressure $P1\_t$ as a target water pressure of the first pump 31 and a second requested water pressure $P2\_t$ as a target water pressure of the second pump 32 based on the requested water pressure $P\_t$. In this control method, the first pump 31 and the second pump 32 are disposed in parallel, and thus the control unit 200 sets the first requested water pressure P1_t and the second requested water pressure P2_t to the requested water pressure P_t.

In Step S107, the control unit 200 controls the first pump 31 and the second pump 32 such that the coolant pressure of the coolant discharged by the first pump 31 becomes the first requested water pressure P1_t and the coolant pressure of the coolant discharged by the second pump 32 becomes the second requested water pressure P2_t. Once the control unit 200 terminates the processing of Step S107, the processing of this routine is terminated. The control routine proceeds to Step S108 in a case where the coolant temperature Tw is lower than the valve opening temperature Twc in Step S103.

In Step S108, the control unit 200 outputs a signal for putting the three-way valve 38 into the second switching position. Upon receiving the signal from the control unit 200, the three-way valve 38 opens the inter-pump water passage 37 and closes the water passage through which the coolant flows from the three-way valve 38 to the confluence point 36 through the first water passage 33. Accordingly, the first pump 31 and the second pump 32 are connected in series.

In Step S109, the control unit 200 calculates the requested water pressure P_t, which is the target water pressure for the pump portion 3 to discharge the requested flow rate Q_t. In this control method, the control unit 200 stores the resistance curve in a case where the thermostat 22 is closed in advance. The control unit 200 calculates the requested water pressure P_t by applying the requested flow rate Q_t to the resistance curve.

In Step S110, the control unit 200 calculates the first requested water pressure P1_t as the target water pressure of the first pump 31 and the second requested water pressure P2_t as the target water pressure of the second pump 32 based on the requested water pressure P_t. In this control method, the first pump 31 and the second pump 32 are disposed in series, and thus the control unit 200 sets the first requested water pressure P1_t and the second requested water pressure P2_t such that the total of the first requested water pressure P1_t and the second requested water pressure P2_t becomes the requested water pressure P_t. Once the control unit 200 terminates the processing of Step S110, the processing proceeds to Step S107, and then the control unit 200 controls the first pump 31 and the second pump 32 and terminates the processing of this routine.

As described above, in the first example of the present disclosure, the control unit 200 indirectly measures the flow path resistance R by measuring the coolant temperature Tw and switches between the serial connection and the parallel connection of the first pump 31 and the second pump 32 in accordance with the coolant temperature Tw. In a case where the flow path resistance R is small, the flow rate can be increased, compared to the case of a single pump or the serial connection, by the first pump 31 and the second pump 32 being connected in parallel. In a case where the flow path resistance R is large, the flow rate can be increased, compared to the case of a single pump or the parallel connection, by the first pump 31 and the second pump 32 being connected in series.

A second control method for the cooling device for an internal combustion engine according to each of the examples described above will be described. This control method can be applied to each of the first to fifth examples described above. In the following description, a case where this control method is applied to the first example will be described as a representative example.

In the second control method, either the first pump 31 or the second pump 32 is used alone in a case where the requested flow rate Q_t can be discharged by the single pump because the requested flow rate Q_t is sufficiently small. In the following description, the flow rate for determining whether or not the discharge can be performed by the use of the single pump will be referred to as a "switching flow rate Qc".

Figure 14:
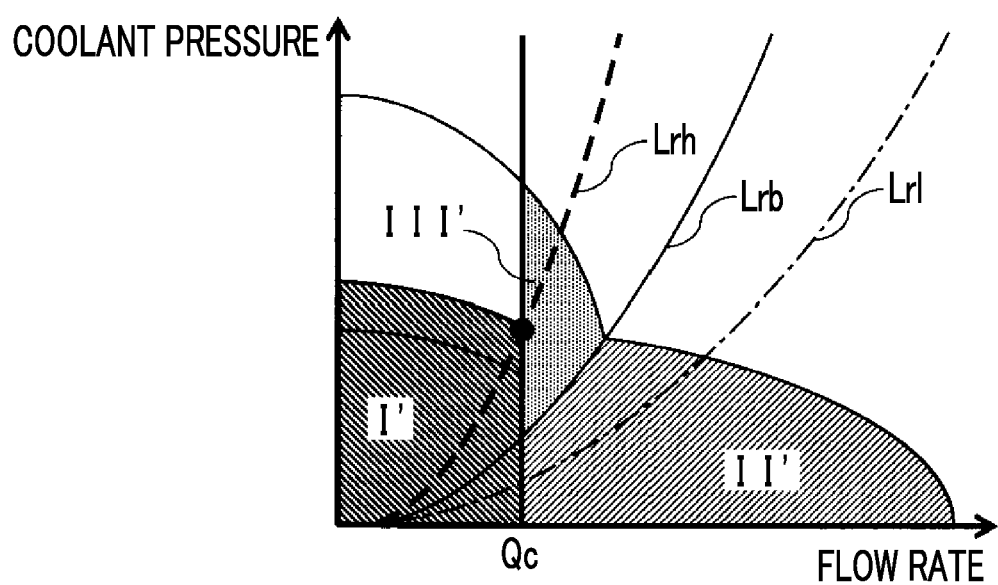
FIG. 14 is a graph showing a change in the pump connection method according to a second control example of the present disclosure.

The switching flow rate Qc will be briefly described with reference to FIG. 14. FIG. 14 is a schematic diagram illustrating a change in the pump connection method according to the second control method. In this control method, as far as the switching flow rate Qc is concerned, the flow rate Q that can be discharged by the use of the single pump when the flow path resistance R is assumed to reach its maximum, that is, when the resistance curve is the dashed line Lrh in FIG. 14 is set to the switching flow rate Qc. In this case, the region in which the flow rate is smaller than the switching flow rate Qc is a region (region 1') in which a movement can be performed by the single pump. In this control method, the region in which the flow rate is larger than the switching flow rate Qc discharges the coolant by using the pumps even in a case where processing can be performed by the single pump. For example, the region in which the flow rate is larger than the switching flow rate Qc and the flow rate is larger than the resistance curve of the reference flow path resistance Rc is a region (region II') in which the first pump 31 and the second pump 32 are connected in parallel and the region in which the flow rate is larger than the switching flow rate Qc and the flow rate is smaller than the resistance curve of the reference flow path resistance Rc is a region (region III') in which the first pump 31 and the second pump 32 are connected in series.

Figure 15:
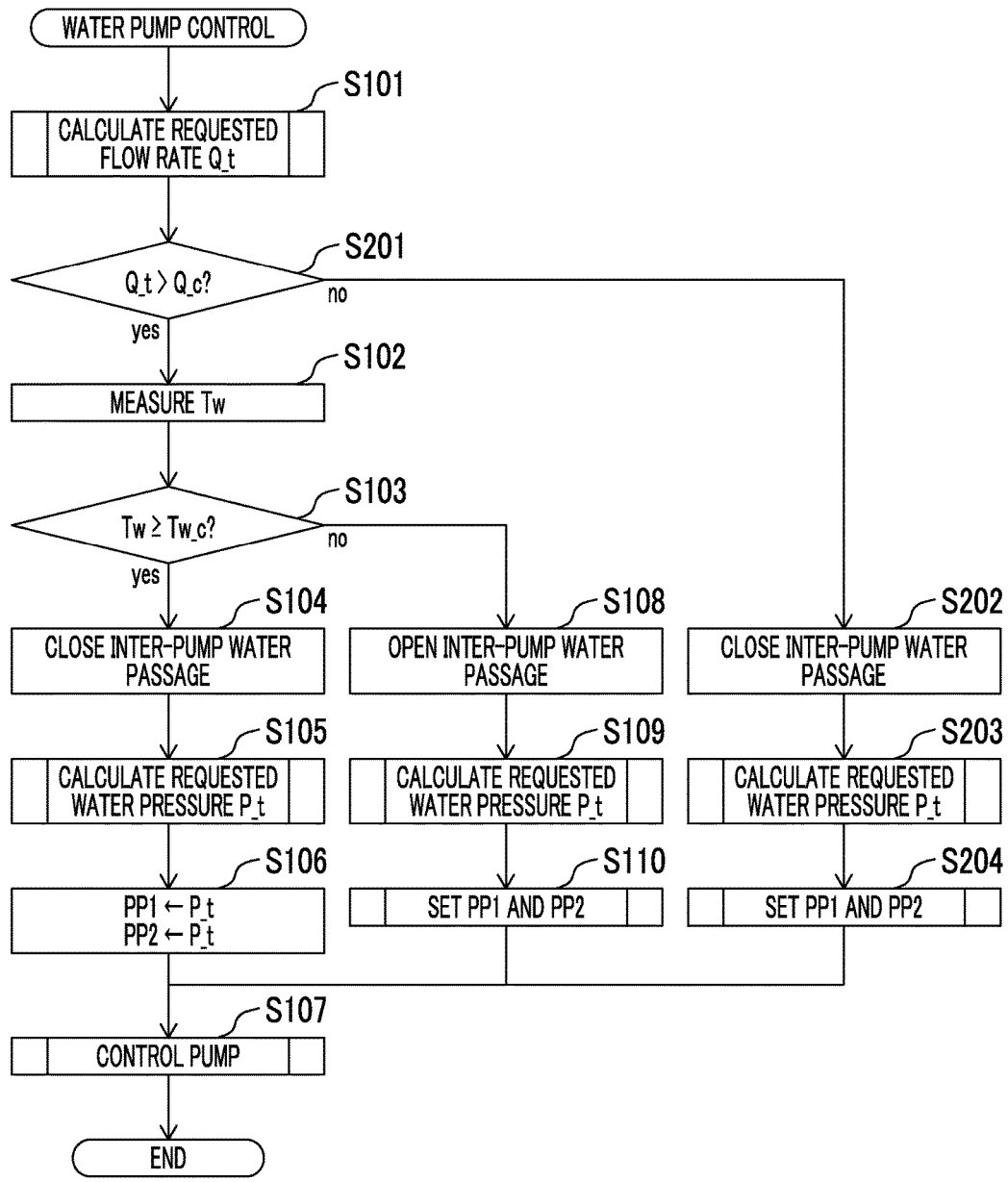
FIG. 15 is a flowchart illustrating a routine of the second control example of the present disclosure.

FIG. 15 is a flowchart illustrating a routine for pump control relating to the second control method. This routine is repeatedly executed at regular intervals.

The control unit 200 calculates the requested flow rate Q_t in Step S101, and then the control routine proceeds to Step S201.

In Step S201, the control unit 200 determines whether or not the requested flow rate Q_t exceeds the switching flow rate Q_c. In a case where the requested flow rate Q_t exceeds the switching flow rate Q_c, the control routine proceeds to Step S102 so that the coolant is discharged by the pumps being used. The processing that follows Step S102 is the same as in the first control method, and thus description thereof will be omitted. In a case where the requested flow rate Q_t is equal to or less than the switching flow rate Q_c, the control routine proceeds to Step S202 so that the coolant is discharged by the single pump being used.

In Step S202, the control unit 200 outputs a signal for putting the three-way valve 38 into the first switching position. The three-way valve 38 closes the inter-pump water passage 37 upon receiving the signal from the control unit 200. As a result, the coolant discharged from the first pump 31 flows through the first water passage 33 as it is without flowing into the inter-pump water passage 37. Accordingly, the first pump 31 and the second pump 32 are connected in parallel. The first pump 31 and the second pump 32 are connected in parallel as described above because one of the pumps cannot be used alone unless the first pump 31 and the second pump 32 are connected in parallel. This is because the coolant cannot flow once either the first pump 31 or the second pump 32 is stopped in a case where the first pump 31 and the second pump 32 are connected in series.

In Step S203, the control unit 200 calculates the requested water pressure P_t, which is the target water pressure for the pump portion 3 to discharge the requested flow rate Q_t.

In Step S204, the control unit 200 calculates the first requested water pressure P1_t as the target water pressure of the first pump 31 and the second requested water pressure P2_t as the target water pressure of the second pump 32 based on the requested water pressure P_t. In this control method, either the first pump 31 or the second pump 32 is driven. In a case where the first pump 31 is driven without the second pump 32 being driven, for example, the control unit 200 sets the first requested water pressure P1_t to the requested water pressure P_t and sets the second requested water pressure P2_t to zero. In other words, the control unit 200 performs setting such that the first pump 31 is driven and the second pump 32 is not driven. Once the processing of Step S204 is terminated, the control routine proceeds to Step S107, and then the control unit 200 controls the first pump 31 and the second pump 32 and terminates the processing of this routine.

When the requested flow rate Q_t to the pump portion 3 is smaller than the switching flow rate Qc (flow rate determined in advance), the control unit 200 (control device) controls the three-way valve 38 (pump switching device) such that the first pump 31 and the second pump 32 are connected in parallel irrespective of the state of the thermostat 22 (water passage switching device) and drives either the first pump 31 or the second pump 32 without driving the other one of the first pump 31 and the second pump 32.

By the second control method as described above, a period in which one of the pumps is not used can be ensured compared to a case where the pumps are used at all times. Accordingly, pump wear can be suppressed.

Figure 16:
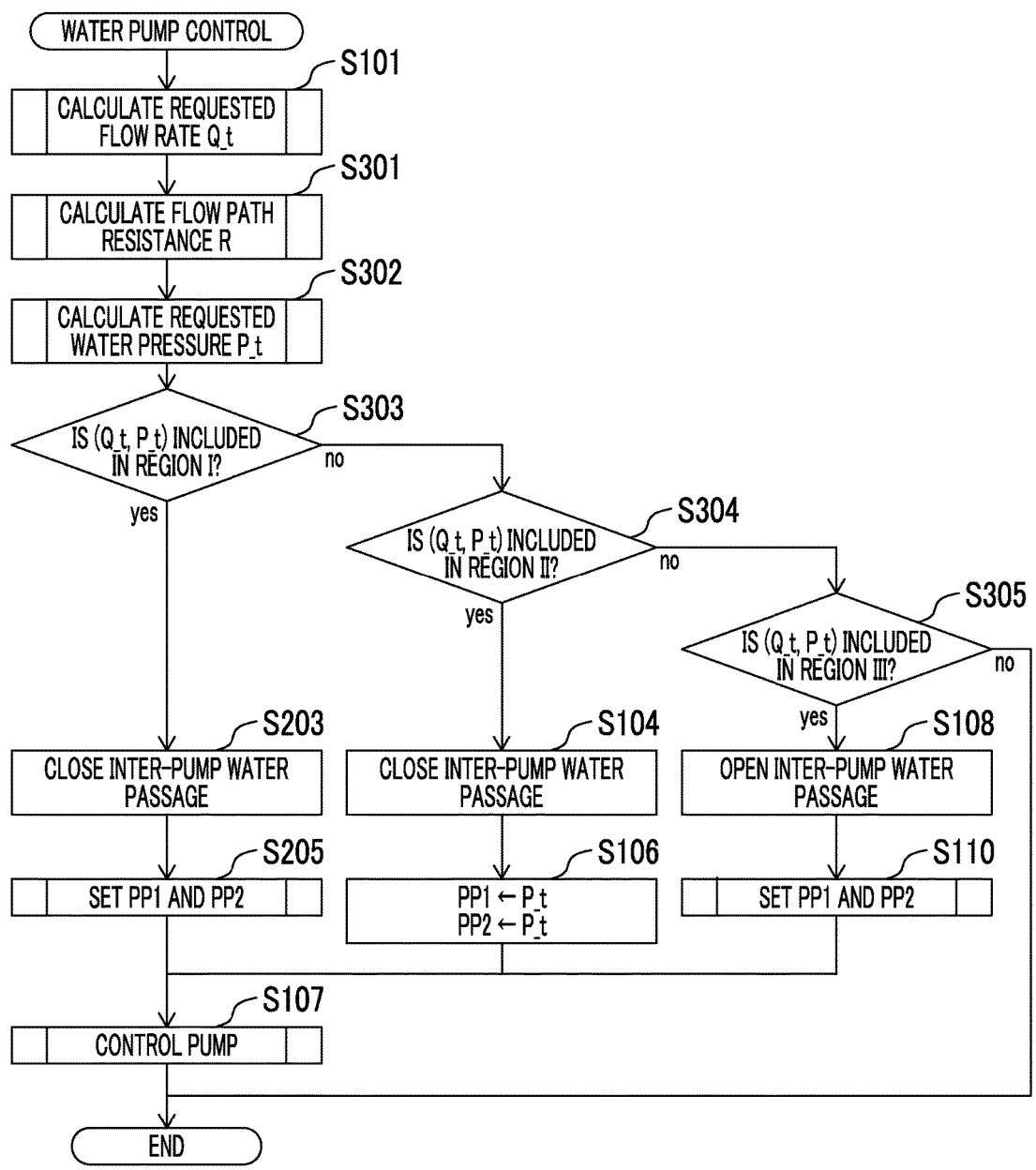
FIG. 16 is a flowchart illustrating a routine of a third control example of the present disclosure.

A third control method for the cooling device for an internal combustion engine according to each of the examples described above will be described. This control method can be applied to each of the first to fifth examples described above. In the following description, a case where this control method is applied to the fourth example will be described as a representative example. FIG. 16 is a flowchart illustrating a routine for pump control relating to the third control method. This routine is repeatedly executed at regular intervals.

In the second control method described above, the requested water pressure P_t is calculated after whether to connect the first pump 31 and the second pump 32 in parallel or in series is determined. In this third control method, in contrast, whether to connect the first pump 31 and the second pump 32 in parallel or in series is set after the requested flow rate Q_t and the requested water pressure P_t are calculated.

The control routine proceeds to Step S301 after the control unit 200 calculates the requested flow rate Q_t in Step S101.

In Step S301, the control unit 200 calculates the flow path resistance R. In this control method, the control unit 200 detects the opening and closing states of the thermostat 22 and the heat exchange on-off valve 26 first. For example, the control unit 200 determines the opening and closing state of the thermostat 22 based on the coolant temperature Tw acquired by the coolant temperature sensor 5 as in Step S103. The control unit 200 determines the opening and closing state of the heat exchange on-off valve 26 by confirming a signal sent to the heat exchange on-off valve 26 by the control unit 200.

The control unit 200 calculates the flow path resistance R corresponding to the opening and closing states of the thermostat 22 and the heat exchange on-off valve 26. For example, the control unit 200 calculates the flow path resistance R by reading the flow path resistance R of the path of the coolant corresponding to the opening and closing state of the thermostat 22 and the opening and closing state of the heat exchange on-off valve 26 recorded in the control unit 200.

In Step S302, the control unit 200 calculates the requested water pressure P_t of the pump portion 3. Since the relationship of, for example, $P\_t = R \times Q\_t^2$ is established, P_t is calculated by the requested flow rate Q_t and the flow path resistance R being used based on the relationship in this control method.

In this control method, the control unit 200 stores a map as illustrated in FIG. 8. The pump connection method corresponding to the requested flow rate Q_t and the requested water pressure P_t is set in the map.

In Step S303, the control unit 200 determines whether or not the pump can be used alone by determining whether or not the requested flow rate Q_t and the requested water pressure P_t are included in the region I illustrated in FIG. 8. In a case where the requested flow rate Q_t and the requested water pressure P_t are included in the region 1, the control routine proceeds to Step S203 so that the pump is driven alone. The processing that follows Step S203 is the same as Steps S203 and S205 according to the second control method except that Step S204 is omitted, and thus description thereof will be omitted. In a case where the requested flow rate Q_t and the requested water pressure P_t are not included in the region I, the control routine proceeds to Step S304.

In Step S304, the control unit 200 determines whether or not to connect the pumps in parallel by determining whether or not the requested flow rate Q_t and the requested water pressure P_t are included in the region II illustrated in FIG. 8. In a case where the requested flow rate Q_t and the requested water pressure P_t are included in the region II, the control routine proceeds to Step S104 so that the pumps are connected in parallel. The processing that follows Step S104 is the same as in the first control method except that Step S105 is omitted, and thus description thereof will be omitted. In a case where the requested flow rate Q_t and the requested water pressure P_t are not included in the region II, the control routine proceeds to Step S305.

In Step S305, the control unit 200 determines whether or not to connect the pumps in series by determining whether or not the requested flow rate Q_t and the requested water pressure P_t are included in the region III illustrated in FIG. 8. In a case where the requested flow rate Q_t and the requested water pressure P_t are included in the region III, the control routine proceeds to Step S108 so that the pumps are connected in series. The processing that follows Step S108 is the same as in the first control method except that Step S109 is omitted, and thus description thereof will be omitted. In a case where the requested flow rate Q_t and the requested water pressure P_t are not included in the region III, the control unit 200 terminates the processing of this routine. The performance of the pump and a cooling circuit are designed such that the coolant can be supplied by a requested amount even under the strictest condition for cooling the engine body 1. Accordingly, the requested flow rate Q_t and the requested water pressure P_t are included in the region III in Step S305 in most cases. Therefore, in a case where the requested flow rate Q_t and the requested water pressure P_t are not included in the region III in Step S305, the control unit 200 may also determine that an abnormality is present and perform processing for dealing with the abnormality.

What is claimed is:

1. A cooling device for an internal combustion engine, the cooling device comprising:
a pump portion configured to pump a coolant of the internal combustion engine;
a circulation water passage including an engine water passage of the internal combustion engine, the circulation water passage being configured to connect the pump portion and the engine water passage to each other such that the coolant returns back to the pump portion through the engine water passage after the coolant is pumped from the pump portion;
a heat exchanger configured to perform heat exchange with the coolant;
a heat exchange water passage on which the heat exchanger is disposed, the heat exchange water passage being disposed in parallel to at least a part of the circulation water passage;
a water passage switching device configured to switch between a state where the coolant is circulated to the heat exchange water passage and a state where the coolant is not circulated to the heat exchange water passage; and
a control device configured to control the pump portion, wherein:
the pump portion includes a first pump, a second pump, and a pump switching device configured to switch between a state where the first pump and the second pump are connected in parallel and a state where the first pump and the second pump are connected in series;
the control device is configured to control the pump switching device such that the first pump and the second pump are connected in parallel when the water passage switching device switches to the state where the coolant is circulated to the heat exchange water passage and the coolant is circulated to the circulation water passage and the heat exchange water passage; and
the control device is configured to control the pump switching device such that the first pump and the second pump are connected in series when the water passage switching device switches to the state where the coolant is not circulated to the heat exchange water passage and the coolant is circulated merely to the circulation water passage.

2. The cooling device according to claim 1, wherein:
the water passage switching device is a thermostat disposed on the heat exchange water passage and configured to switch between a valve open state and a valve closed state in accordance with a coolant temperature of the coolant;
the thermostat is configured such that the coolant is circulated to the heat exchange water passage when the thermostat is in the valve open state; and
the thermostat is configured such that the circulation of the coolant to the heat exchange water passage is stopped when the thermostat is in the valve closed state.

3. The cooling device according to claim 1, wherein:
a maximum flow rate that is output by the pump portion by the pump switching device connecting the first pump and the second pump in parallel to each other exceeds a maximum flow rate that is output by the pump portion by the pump switching device connecting the first pump and the second pump in series to each other when the water passage switching device switches to the state where the coolant is circulated to the heat exchange water passage; and the maximum flow rate that is output by the pump portion by the pump switching device connecting the first pump and the second pump in parallel to each other is smaller than the maximum flow rate that is output by the pump portion by the pump switching device connecting the first pump and the second pump in series to each other when the water passage switching device switches to the state where the coolant is not circulated to the heat exchange water passage.

4. The cooling device according to claim 1, wherein:
the circulation water passage and the heat exchange water passage are configured such that a flow path resistance of a path of the coolant is equal to or less than a reference flow path resistance when the water passage switching device switches to the state where the coolant is circulated to the heat exchange water passage and the flow path resistance of the path of the coolant exceeds the reference flow path resistance when the water passage switching device switches to the state where the coolant is not circulated to the heat exchange water passage;
when a curve representing a relationship between a flow rate and a water pressure at a time when the flow path resistance of the path of the coolant is any value is a resistance curve, the reference flow path resistance is a flow path resistance at a time when the resistance curve passes through an intersection point between a parallel characteristic curve and a series characteristic curve;
the parallel characteristic curve is a curve representing a relationship between a maximum flow rate and a maximum water pressure that is output by the pump portion in the state where the first pump and the second pump are connected in parallel; and
the series characteristic curve is a curve representing the relationship between the maximum flow rate and the maximum water pressure that is output by the pump portion in the state where the first pump and the second pump are connected in series.

5. The cooling device according to claim 1, wherein the control device is configured to control the pump switching device such that the first pump and the second pump are connected in parallel irrespective of a state of the water passage switching device and drive merely one of the first pump and the second pump when a requested flow rate to the pump portion is smaller than a flow rate determined in advance.

6. The cooling device according to claim 1, wherein:
the heat exchanger includes a first heat exchanger and a second heat exchanger;
the heat exchange water passage includes a first heat exchange water passage on which the first heat exchanger is disposed, the first heat exchange water passage being disposed in parallel to at least a part of the circulation water passage, and a second heat exchange water passage on which the second heat exchanger is disposed, the second heat exchange water passage being disposed in parallel to at least a part of the circulation water passage;
the water passage switching device includes a first water passage switching device switching between a state where the coolant is circulated to the first heat exchange water passage and a state where the coolant is not circulated to the first heat exchange water passage and a second water passage switching device switching between a state where the coolant is circulated to the second heat exchange water passage and a state where the coolant is not circulated to the second heat exchange water passage;
the water passage switching device switches to the state where the coolant is circulated to the heat exchange water passage when the first water passage switching device switches to the state where the coolant is circulated to the first heat exchange water passage and the second water passage switching device switches to the state where the coolant is circulated to the second heat exchange water passage; and
the water passage switching device switches to the state where the coolant is not circulated to the heat exchange water passage when the first water passage switching device switches to the state where the coolant is not circulated to the first heat exchange water passage and the second water passage switching device switches to the state where the coolant is not circulated to the second heat exchange water passage.

7. The cooling device according to claim 6, wherein:
the control device is configured to store, as a first region, a region of a flow rate and a water pressure that is output simply by the first pump and the second pump being connected in parallel when the first water passage switching device and the second water passage switching device switch to a state where the coolant is circulated to either the first heat exchange water passage or the second heat exchange water passage;
the control device is configured to store, as a second region, a region of the flow rate and the water pressure that is output simply by the first pump and the second pump being connected in series when the first water passage switching device and the second water passage switching device switch to the state where the coolant is circulated to either the first heat exchange water passage or the second heat exchange water passage;
the control device is configured to calculate a requested flow rate to the pump portion and a requested water pressure to the pump portion determined by the requested flow rate, a state of the first water passage switching device, and a state of the second water passage switching device;
the control device is configured to control the pump switching device such that the first pump and the second pump are connected in parallel in a case where the requested flow rate and the requested water pressure are included in the first region; and
the control device is configured to control the pump switching device such that the first pump and the second pump are connected in series in a case where the requested flow rate and the requested water pressure are included in the second region.

8. The cooling device according to claim 1, wherein:
the pump portion includes the first pump pumping the coolant, the second pump pumping the coolant, an inlet water passage into which the coolant flows, an outlet water passage from which the coolant flows out, a first water passage on which the first pump is disposed, a second water passage on which the second pump is disposed, an inter-pump water passage, and a check valve;
the first water passage and the second water passage communicate with the inlet water passage at a branch point, are disposed in parallel to each other, and communicate with the outlet water passage at a confluence point;
the inter-pump water passage allows a water passage of the first water passage on a coolant discharge side of the first pump and a water passage of the second water passage on a coolant suction side of the second pump to communicate with each other;
the check valve is disposed on the second water passage between a connection portion between the second water passage and the inter-pump water passage and the branch point;
the pump switching device is a three-way valve disposed in a connection portion between the first water passage and the inter-pump water passage;
the three-way valve is configured to selectively switch between a first switching position at which the coolant is circulated to the first water passage as it is without flowing into the inter-pump water passage after the coolant flows through the first water passage and a second switching position at which the coolant is allowed to flow into the inter-pump water passage without circulating to the first water passage as it is after the coolant flows through the first water passage; and
the control device is configured to switch the three-way valve to the first switching position when the first pump and the second pump are connected in parallel and switch the three-way valve to the second switching position when the first pump and the second pump are connected in series.

9. The cooling device according to claim 1, wherein:
the pump portion includes the first pump pumping the coolant, the second pump pumping the coolant, an inlet water passage into which the coolant flows, an outlet water passage from which the coolant flows out, a first water passage on which the first pump is disposed, a second water passage on which the second pump is disposed, an inter-pump water passage, a first check valve, a second check valve, and the pump switching device;
first water passage and the second water passage communicate with the inlet water passage at a branch point, are disposed in parallel to each other, and communicate with the outlet water passage at a confluence point between the first water passage and the second water passage;
the inter-pump water passage allows a water passage of the first water passage on a coolant discharge side of the first pump and a water passage of the second water passage on a coolant suction side of the second pump to communicate with each other;
the first check valve is disposed on the second water passage between a connection portion between the second water passage and the inter-pump water passage and the branch point;
the second check valve is disposed on the first water passage between a connection portion between the first water passage and the inter-pump water passage and the confluence point;
the pump switching device is disposed on the inter-pump water passage;
the first pump is disposed on the first water passage between the connection portion between the first water passage and the inter-pump water passage and the branch point;
the second pump is disposed on the second water passage between the connection portion between the second water passage and the inter-pump water passage and the confluence point;
the pump switching device is an on-off valve disposed on the inter-pump water passage;

the on-off valve is configured to selectively switch between a first switching position at which the inter-pump water passage is closed and a second switching position at which the inter-pump water passage is open; and the control device is configured to put the on-off valve into the first switching position when the first pump and the second pump are connected in parallel and put the on-off valve into the second switching position when the first pump and the second pump are connected in series.

\* \* \* \* \*

UNITED STATES PATENT AND TRADEMARK OFFICE
CERTIFICATE OF CORRECTION

PATENT NO. : 10,422,269 B2
APPLICATION NO. : 15/958501
DATED : September 24, 2019
INVENTOR(S) : Yukitoshi Aoyama et al.

It is certified that error appears in the above-identified patent and that said Letters Patent is hereby corrected as shown below:

In the Specification

In Column 12, Line 57, delete "watch" and insert --water--, therefor.
In Column 15, Line 40 & 41, after "pump", insert --characteristic curve in a case where the first pump 31 and the second pump--.
In Column 23, Line 50, after "second pump", delete "33" and insert --32--, therefor.
In Column 24, Line 24, delete "continence" and insert --confluence--, therefor.
In Column 24, Line 27, delete "continence" and insert --confluence--, therefor.
In Column 25, Line 44, delete "continence" and insert --confluence--, therefor.
In Column 27, Line 14, delete "info" and insert --into--, therefor.

In the Claims

In Claim 9, Column 34, Line 37, before "first", insert --the--.

Signed and Sealed this
Twelfth Day of November, 2019

Andrei Iancu
*Director of the United States Patent and Trademark Office*